United States Patent
Li et al.

(10) Patent No.: US 10,911,119 B2
(45) Date of Patent: Feb. 2, 2021

(54) WIRELESS COMMUNICATION DEVICE AND METHOD

(71) Applicant: Sony Corporation, Tokyo (JP)

(72) Inventors: Nanxi Li, Beijing (CN); Jinhui Chen, Beijing (CN); Zaixue Wei, Beijing (CN); Xin Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/561,557

(22) PCT Filed: Mar. 25, 2016

(86) PCT No.: PCT/CN2016/077360
§ 371 (c)(1),
(2) Date: Sep. 26, 2017

(87) PCT Pub. No.: WO2016/155571
PCT Pub. Date: Oct. 6, 2016

(65) Prior Publication Data
US 2018/0083682 A1 Mar. 22, 2018

(30) Foreign Application Priority Data
Apr. 3, 2015 (CN) .......................... 2015 1 0158311

(51) Int. Cl.
*H04B 7/06* (2006.01)
*H04L 5/00* (2006.01)
(Continued)

(52) U.S. Cl.
CPC ......... *H04B 7/0626* (2013.01); *H04L 5/0023* (2013.01); *H04L 5/0051* (2013.01);
(Continued)

(58) Field of Classification Search
None
See application file for complete search history.

(56) References Cited

U.S. PATENT DOCUMENTS 9,252,930 B2 *  2/2016  Qu ......................... H04L 5/0057
9,326,275 B2 *  4/2016  Anbe .................... H04W 28/04
(Continued)

FOREIGN PATENT DOCUMENTS

CN          102378275 A        3/2012
CN          104052532 A   *    9/2014   ........... H04B 7/0619
(Continued)

OTHER PUBLICATIONS

International Search Report dated Jun. 13, 2016 in PCT/CN2016/077360 filed Mar. 25, 2016.
(Continued)

*Primary Examiner* — Berhanu Tadese
(74) *Attorney, Agent, or Firm* — Xsensus LLP

(57) ABSTRACT

A wireless communication device and method used in a base station side and a user equipment side. The wireless communication device used in the base station includes one or more processors configured to respectively configure, based on an antenna configuration of a base station and on a plurality of spatial dimensions, a downlink reference signal of the base station, and generate a control message comprising an indication indicating that the base station respectively transmits, on the plurality of spatial dimensions, the downlink reference signal, so as to be used in a user equipment served by the base station.

20 Claims, 12 Drawing Sheets

(51) Int. Cl.
*H04B 7/0417* (2017.01)
*H04W 88/08* (2009.01)

(52) U.S. Cl.
CPC .......... *H04L 5/0053* (2013.01); *H04B 7/0417* (2013.01); *H04B 7/063* (2013.01); *H04B 7/0632* (2013.01); *H04B 7/0639* (2013.01); *H04W 88/08* (2013.01)

(56) References Cited

U.S. PATENT DOCUMENTS

| | | | |
|---|---|---|---|
| 9,374,819 B2* | 6/2016 | Kim | H04B 7/2656 |
| 9,577,775 B2* | 2/2017 | Gou | H04L 5/0098 |
| 9,755,713 B2* | 9/2017 | Kim | H04L 5/0048 |
| 9,843,427 B2* | 12/2017 | Urabayashi | H04W 48/12 |
| 10,027,395 B2* | 7/2018 | Park | H04W 24/08 |
| 10,116,371 B2* | 10/2018 | Park | H04B 7/0478 |
| 10,320,465 B2* | 6/2019 | Park | H04L 5/0057 |
| 10,447,355 B2* | 10/2019 | Qian | H04B 7/06 |
| 10,455,395 B2* | 10/2019 | Gharabegian | H02S 20/10 |
| 2012/0218911 A1* | 8/2012 | Zhu | H04B 7/024 370/252 |
| 2012/0257515 A1* | 10/2012 | Hugl | H04B 7/0632 370/252 |
| 2012/0264441 A1* | 10/2012 | Chandrasekhar | H04L 5/0073 455/450 |
| 2013/0044693 A1* | 2/2013 | Lindh | H04L 5/0051 370/329 |
| 2013/0195025 A1* | 8/2013 | Chatterjee | H04B 7/0639 370/329 |
| 2013/0201946 A1* | 8/2013 | Lunttila | H04W 24/02 370/329 |
| 2013/0258954 A1* | 10/2013 | Khoshnevis | H04L 1/0026 370/329 |
| 2013/0258964 A1* | 10/2013 | Nam | H04L 1/0053 370/329 |
| 2013/0288730 A1* | 10/2013 | Gomadam | H04B 7/024 455/509 |
| 2013/0301447 A1* | 11/2013 | Gomadam | H04B 7/063 370/252 |
| 2013/0301548 A1* | 11/2013 | Etemad | H04W 52/0235 370/329 |
| 2013/0315191 A1* | 11/2013 | Yoshimoto | H04J 11/0056 370/329 |
| 2013/0315195 A1* | 11/2013 | Ko | H04L 5/005 370/329 |
| 2013/0329664 A1* | 12/2013 | Kim | H04B 7/0632 370/329 |
| 2013/0336269 A1* | 12/2013 | Davydov | H04W 24/02 370/329 |
| 2013/0343317 A1* | 12/2013 | Etemad | H04B 7/0626 370/329 |
| 2014/0018120 A1* | 1/2014 | Anbe | H04L 1/20 455/509 |
| 2014/0036706 A1* | 2/2014 | Mondal | H04W 24/08 370/252 |
| 2014/0079149 A1* | 3/2014 | Lee | H04B 7/0417 375/267 |
| 2014/0105075 A1* | 4/2014 | Ahmadi | H04B 7/2656 370/280 |
| 2014/0141830 A1* | 5/2014 | Skov | H04W 52/146 455/522 |
| 2014/0219115 A1* | 8/2014 | Etemad | H04L 47/26 370/252 |
| 2014/0241200 A1* | 8/2014 | Chun | H04L 5/0048 370/252 |
| 2014/0247816 A1* | 9/2014 | Kim | H04W 72/0446 370/336 |
| 2015/0043673 A1* | 2/2015 | Lee | H04B 7/0632 375/267 |
| 2015/0215018 A1* | 7/2015 | Xiong | H04W 72/06 370/329 |
| 2015/0271814 A1* | 9/2015 | Park | H04L 5/0082 370/329 |
| 2015/0271859 A1* | 9/2015 | Huang | H04B 1/3827 370/329 |
| 2015/0341093 A1* | 11/2015 | Ji | H04B 7/0478 375/267 |
| 2016/0080059 A1* | 3/2016 | Yoon | H04B 7/0626 370/329 |
| 2016/0105248 A1* | 4/2016 | Lunttila | H04B 17/345 370/252 |
| 2016/0149687 A1* | 5/2016 | Lei | H04L 5/0055 370/280 |
| 2016/0156394 A1* | 6/2016 | Kim | H04B 7/0417 375/267 |
| 2016/0211902 A1* | 7/2016 | Park | H04B 7/0456 |
| 2016/0212643 A1* | 7/2016 | Park | H04L 5/0048 |
| 2016/0345346 A1* | 11/2016 | Kim | H04W 72/1268 |
| 2017/0288758 A1* | 10/2017 | Kakishima | H04L 5/0014 |
| 2017/0318922 A1* | 11/2017 | Gharabegian | B60L 53/51 |
| 2017/0324372 A1* | 11/2017 | Gharabegian | H02S 30/20 |
| 2018/0062711 A1* | 3/2018 | Mizusawa | H04B 7/0469 |
| 2018/0083682 A1* | 3/2018 | Li | H04L 5/0053 |
| 2018/0123659 A1* | 5/2018 | Qian | H04B 7/04 |
| 2018/0198510 A1* | 7/2018 | Park | H04L 5/0048 |
| 2018/0289120 A1* | 10/2018 | Gharabegian | H05B 47/105 |
| 2019/0078347 A1* | 3/2019 | Gharabegian | E04H 15/02 |
| 2019/0261280 A1* | 8/2019 | Jung | H04W 72/14 |
| 2019/0261281 A1* | 8/2019 | Jung | H04W 52/146 |
| 2019/0273549 A1* | 9/2019 | Park | H04B 7/0628 |
| 2019/0306730 A1* | 10/2019 | Zhang | H04W 56/001 |

FOREIGN PATENT DOCUMENTS

| | | | | |
|---|---|---|---|---|
| CN | 104052532 A | * | 9/2014 | .......... H04B 7/0684 |
| WO | 2014/046485 A1 | | 3/2014 | |
| WO | WO-2014043673 A1 | * | 3/2014 | .............. G01N 21/85 |
| WO | WO-2014046485 A1 | * | 3/2014 | .......... H04B 7/0632 |
| WO | 2014123340 A1 | | 8/2014 | |
| WO | WO-2014123340 A1 | * | 8/2014 | .......... H04L 5/0057 |
| WO | WO 2014123340 A1 | * | 8/2014 | .......... H04B 7/0417 |
| WO | WO-2014139303 A1 | * | 9/2014 | .......... H04B 7/0619 |
| WO | WO-2016155571 A1 | * | 10/2016 | .......... H04L 5/0023 |
| WO | WO 2016155571 A1 | * | 10/2016 | .............. H04B 7/06 |
| WO | WO-2019137441 A1 | * | 7/2019 | .............. H04B 7/06 |

OTHER PUBLICATIONS

Supplemental European Search Report dated Nov. 16, 2018, issued in corresponding European Application No. 16771326, 10 pages.
Samsung "Configuration and Control Signaling for Rel. 13 FD-MIMO" 3GPP Draft; R1-150380, 3rd Generation Partnership Project (3GPP), Mobile Competence Centre; 650, Athens, Greece—Feb. 9-13, 2015, 5 pages.
ETRI "CSI Feedback Enhancements for EBF/FD-MIMO" 3GPP TSG RAN WG1 Meeting #80 R1-150519, Mobile Competence Centre; 650, Athens, Greece—Feb. 9-13, 2015, 3 pages.

* cited by examiner

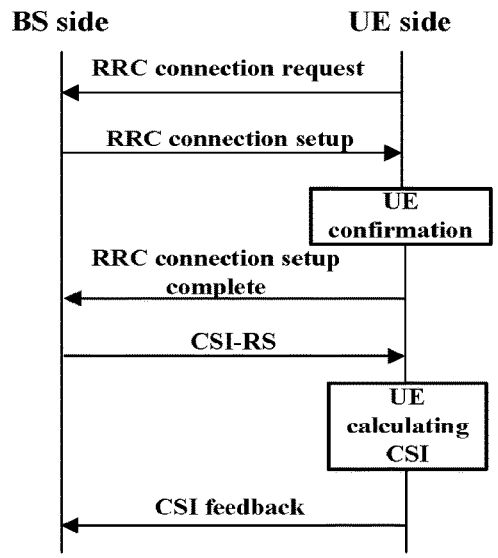
Figure 3
| CSI-RS category | SubframeConfig $I_{CSI-RS}$ | CSI-RS period $T_{CSI-RS}$ | CSI-RS subframe offset $\Delta_{CSI-RS}$ |
|---|---|---|---|
| H-CSI-RS ($I_{CSI-RS,H}$) | 0 – 4 | 5 | $I_{CSI-RS}$ |
|  | 5 – 14 | 10 | $I_{CSI-RS} - 5$ |
|  | 15 – 34 | 20 | $I_{CSI-RS} - 15$ |
|  | 35 – 74 | 40 | $I_{CSI-RS} - 35$ |
|  | 75 – 154 | 80 | $I_{CSI-RS} - 75$ |
| V-CSI-RS ($I_{CSI-RS,V}$) | 155-159 | 5 | $I_{CSI-RS} - 155$ |
|  | 160-169 | 10 | $I_{CSI-RS} - 160$ |
|  | 170-189 | 20 | $I_{CSI-RS} - 170$ |
|  | 190-229 | 40 | $I_{CSI-RS} - 190$ |
|  | 230-309 | 80 | $I_{CSI-RS} - 230$ |
Figure 4
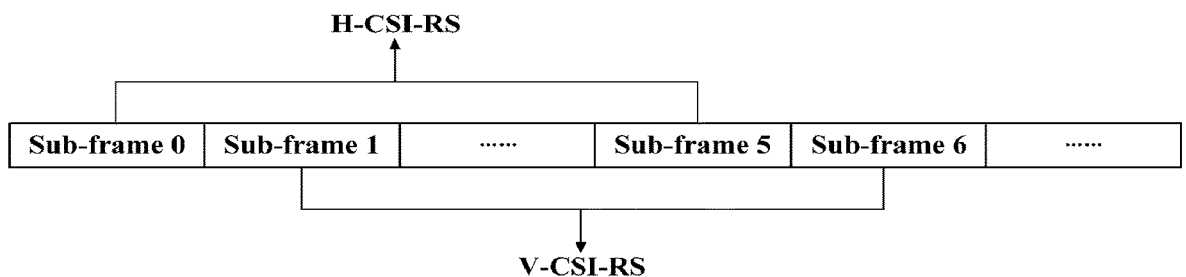
Figure 5

| $I_{CQI/PMI}$ | $N_{pd}$ | $N_{OFFSET,CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI} - 2$ |
| $7 \leq I_{CQI/PMI} \leq 16$ | 10 | $I_{CQI/PMI} - 7$ |
| $17 \leq I_{CQI/PMI} \leq 36$ | 20 | $I_{CQI/PMI} - 17$ |
| $37 \leq I_{CQI/PMI} \leq 76$ | 40 | $I_{CQI/PMI} - 37$ |
| $77 \leq I_{CQI/PMI} \leq 156$ | 80 | $I_{CQI/PMI} - 77$ |
| $157 \leq I_{CQI/PMI} \leq 316$ | 160 | $I_{CQI/PMI} - 157$ |
| $I_{CQI/PMI} = 317$ | Reserved | |
| $318 \leq I_{CQI/PMI} \leq 349$ | 32 | $I_{CQI/PMI} - 318$ |
| $350 \leq I_{CQI/PMI} \leq 413$ | 64 | $I_{CQI/PMI} - 350$ |
| $414 \leq I_{CQI/PMI} \leq 541$ | 128 | $I_{CQI/PMI} - 414$ |
| $542 \leq I_{CQI/PMI} \leq 1023$ | Reserved | |

Figure 6

| $I_{CQI/PMI}$ category | $I_{CQI/PMI}$ | $N_{pd}$ | $N_{OFFSET,CQI}$ |
|---|---|---|---|
| $I_{CQI/PMI,H}$ | $0 \leq I_{CQI/PMI} \leq 1$ | 2 | $I_{CQI/PMI}$ |
| | $2 \leq I_{CQI/PMI} \leq 6$ | 5 | $I_{CQI/PMI} - 2$ |
| | $7 \leq I_{CQI/PMI} \leq 16$ | 10 | $I_{CQI/PMI} - 7$ |
| | $17 \leq I_{CQI/PMI} \leq 36$ | 20 | $I_{CQI/PMI} - 17$ |
| | $37 \leq I_{CQI/PMI} \leq 76$ | 40 | $I_{CQI/PMI} - 37$ |
| | $77 \leq I_{CQI/PMI} \leq 156$ | 80 | $I_{CQI/PMI} - 77$ |
| | $157 \leq I_{CQI/PMI} \leq 316$ | 160 | $I_{CQI/PMI} - 157$ |
| | $I_{CQI/PMI} = 317$ | Reserved | |
| | $318 \leq I_{CQI/PMI} \leq 349$ | 32 | $I_{CQI/PMI} - 318$ |
| | $350 \leq I_{CQI/PMI} \leq 413$ | 64 | $I_{CQI/PMI} - 350$ |
| | $414 \leq I_{CQI/PMI} \leq 541$ | 128 | $I_{CQI/PMI} - 414$ |
| $I_{CQI/PMI,V}$ | $542 \leq I_{CQI/PMI} \leq 543$ | 2 | $I_{CQI/PMI} - 542$ |
| | $544 \leq I_{CQI/PMI} \leq 548$ | 5 | $I_{CQI/PMI} - 544$ |
| | $549 \leq I_{CQI/PMI} \leq 558$ | 10 | $I_{CQI/PMI} - 549$ |
| | $559 \leq I_{CQI/PMI} \leq 578$ | 20 | $I_{CQI/PMI} - 559$ |
| | $579 \leq I_{CQI/PMI} \leq 618$ | 40 | $I_{CQI/PMI} - 579$ |
| | $619 \leq I_{CQI/PMI} \leq 698$ | 80 | $I_{CQI/PMI} - 619$ |
| | $699 \leq I_{CQI/PMI} \leq 858$ | 160 | $I_{CQI/PMI} - 699$ |
| | $I_{CQI/PMI} = 859$ | Reserved | |
| | $860 \leq I_{CQI/PMI} \leq 891$ | 32 | $I_{CQI/PMI} - 860$ |
| | $892 \leq I_{CQI/PMI} \leq 955$ | 64 | $I_{CQI/PMI} - 892$ |
| | $955 \leq I_{CQI/PMI} \leq 1023$ | Reserved | |

Figure 7

| $I_{CQI/PMI}$ category | $I_{CQI/PMI}$ | $N_{pd}$ | $N_{OFFSET,CQI}$ |
|---|---|---|---|
| $I_{CQI/PMI,H}$ | $I_{CQI/PMI}=0$ | 1 | $I_{CQI/PMI}$ |
| | $1 \leq I_{CQI/PMI} \leq 5$ | 5 | $I_{CQI/PMI} - 1$ |
| | $6 \leq I_{CQI/PMI} \leq 15$ | 10 | $I_{CQI/PMI} - 6$ |
| | $16 \leq I_{CQI/PMI} \leq 35$ | 20 | $I_{CQI/PMI} - 16$ |
| | $36 \leq I_{CQI/PMI} \leq 75$ | 40 | $I_{CQI/PMI} - 36$ |
| | $76 \leq I_{CQI/PMI} \leq 155$ | 80 | $I_{CQI/PMI} - 76$ |
| | $156 \leq I_{CQI/PMI} \leq 315$ | 160 | $I_{CQI/PMI} - 156$ |
| $I_{CQI/PMI,V}$ | $I_{CQI/PMI}=316$ | 1 | $I_{CQI/PMI} - 316$ |
| | $317 \leq I_{CQI/PMI} \leq 321$ | 5 | $I_{CQI/PMI} - 317$ |
| | $322 \leq I_{CQI/PMI} \leq 331$ | 10 | $I_{CQI/PMI} - 322$ |
| | $332 \leq I_{CQI/PMI} \leq 351$ | 20 | $I_{CQI/PMI} - 332$ |
| | $352 \leq I_{CQI/PMI} \leq 391$ | 40 | $I_{CQI/PMI} - 352$ |
| | $392 \leq I_{CQI/PMI} \leq 471$ | 80 | $I_{CQI/PMI} - 392$ |
| | $472 \leq I_{CQI/PMI} \leq 631$ | 160 | $I_{CQI/PMI} - 472$ |
| | $632 \leq I_{CQI/PMI} \leq 1023$ | Reserved | |

Figure 8

| Value of CSI request field | Description |
|---|---|
| '00' | Not triggering non-periodic feedback |
| '01' | Only triggering non-periodic feedback of H-CSI |
| '10' | Only triggering non-periodic feedback of V-CSI |
| '11' | Triggering non-periodic feedback of H-CSI and V-CSI simultaneously |

Figure 9

| Value of CSI request field | Description |
|---|---|
| '000' | Not triggering non-periodic feedback |
| '001' | Serving cell c only triggering non-periodic feedback of H-CSI |
| '010' | Serving cell c only triggering non-periodic feedback of V-CSI |
| '011' | Serving cell c triggering non-periodic feedback of H-CSI and V-CSI simultaneously |
| '100' | A first serving cell set configured by high level signaling only triggering non-periodic feedback of V-CSI |
| '101' | A second serving cell set configured by high level signaling only triggering non-periodic feedback of V-CSI |
| '110' | A first serving cell set configured by high level signaling triggering non-periodic feedback of H-CSI and V-CSI simultaneously |
| '111' | A second serving cell set configured by high level signaling triggering non-periodic feedback of H-CSI and V-CSI simultaneously |

Figure 10

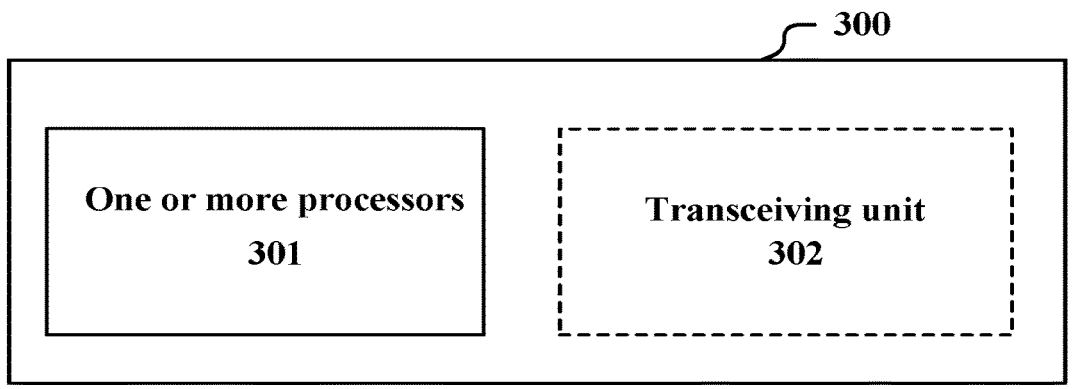

Figure 11

WIRELESS COMMUNICATION DEVICE AND METHOD

FIELD OF THE INVENTION

The embodiments of the present disclosure generally relate to the field of wireless communications, and in particular to an apparatus and a method for wireless communications on a base station side and a user equipment side. More particularly, the embodiments of the present disclosure relates to an antenna technology in a large scale multi-input multi-output (MIMO) communication system.

BACKGROUND OF THE INVENTION

At present, there is concern about the potential performance enhancement of communication systems brought by using two-dimensional active antenna arrays. For example, the study of vertical beamforming/full-dimensional MIMO has been initiated. In the MIMO system, the introduction of the two-dimensional active antenna array brings about opportunities and challenges. On one hand, it makes it possible for the MIMO system to utilize the vertical dimension. On the other hand, with the introduction of the vertical dimension, it may be necessary to define more antenna ports, and it may also be necessary to redesign relevant signaling and signals such as the channel state information reference signal to solve the problem of overhead due to the newly introduced vertical dimension.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, there is provided an apparatus for wireless communications, which includes: one or more processors configured to configure, based on an antenna configuration of a base station, downlink reference signals of the base station in a plurality of spatial dimensions respectively; and generate a control message containing an indication that the base station transmits the downlink reference signals in the plurality of spatial dimensions respectively, for use by a communication device served by the base station.

According to another aspect of the present disclosure, there is provided an apparatus for wireless communications, which includes: one or more processors, configured to determine, based on a control message from a base station, that the base station transmits downlink reference signals in a plurality of spatial dimensions respectively; and measure, in response to a measurement indication from the base station, downlink reference signals in respective spatial dimensions and generate measurement feedback information for respective spatial dimensions.

According to one aspect of the present disclosure, there is provided a method for wireless communications, which includes: configuring, based on an antenna configuration of a base station, downlink reference signals of the base station in a plurality of spatial dimensions respectively; and generating a control message containing an indication that the base station transmits the downlink reference signals in the plurality of spatial dimensions respectively, for use by a communication device served by the base station.

According to another aspect of the present disclosure, there is provided a method for wireless communications, which includes: determining, based on a control message from a base station, that the base station transmits downlink reference signals in a plurality of spatial dimensions respectively; and measuring, in response to a measurement indication from the base station, downlink reference signals in respective spatial dimensions and generate measurement feedback information for respective spatial dimensions.

According to other aspects of the present disclosure, there are also provided computer program codes and computer program products for implementing the above mentioned methods for wireless communications and a computer readable storage medium in which computer program codes for implementing the above methods for wireless communication on the base station side and the user equipment side are recorded.

With the apparatus and the method for wireless communications according to the present application, independent configuration and measurement feedback for downlink reference signals in multiple spatial dimensions may be achieved, thereby achieving at least one of the following effects: a lower signaling overhead and complexity can be acquired; a flexible measurement feedback scheme can be acquired, thereby further reducing the system overhead; and channel information of multiple spatial dimensions can be acquired effectively, thereby sufficiently utilizing spatial resources, and thus the system performance is improved.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings:

FIG. 3 illustrates a signaling flow chart regarding CSI-RS transmission and CSI feedback, as well as 3GPP standards associated with respective processes;

FIG. 4 illustrates an example of sub-frame configuration of H-CSI-RS and V-CSI-RS;

FIG. 5 illustrates an example of positions of sub-frames in the case that H-CSI-RS and V-CSI-RS have the same transmission period;

FIG. 6 illustrates a mapping relationship of $I_{CQI/PMI}$ with a feedback period $N_{pd}$ and a feedback sub-frame offset $N_{OFFSET,CQI}$ in existing standards;

FIG. 7 is a diagram illustrating an example of a mapping relationship of $I_{CQI/PMI}$ with the feedback period $N_{pd}$ and the feedback sub-frame offset $N_{OFFSET,CQI}$ in a FDD system according to the embodiments of the present disclosure;

FIG. 8 is a diagram illustrating an example of a mapping relationship of $I_{CQI/PMI}$ with the feedback period $N_{pd}$ and the feedback sub-frame offset $N_{OFFSET,CQI}$ in a TDD system according to the embodiments of the present disclosure;

FIG. 9 is a diagram illustrating an example of a definition of a CSI request field according to the embodiments of the present disclosure;

FIG. 10 is a diagram illustrating another example of the definition of the CSI request field according to the embodiments of the present disclosure;

FIG. 11 is a block diagram illustrating a structure of an apparatus for wireless communications according to an embodiment of the present disclosure;

DETAILED DESCRIPTION OF THE EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

Figure 1:
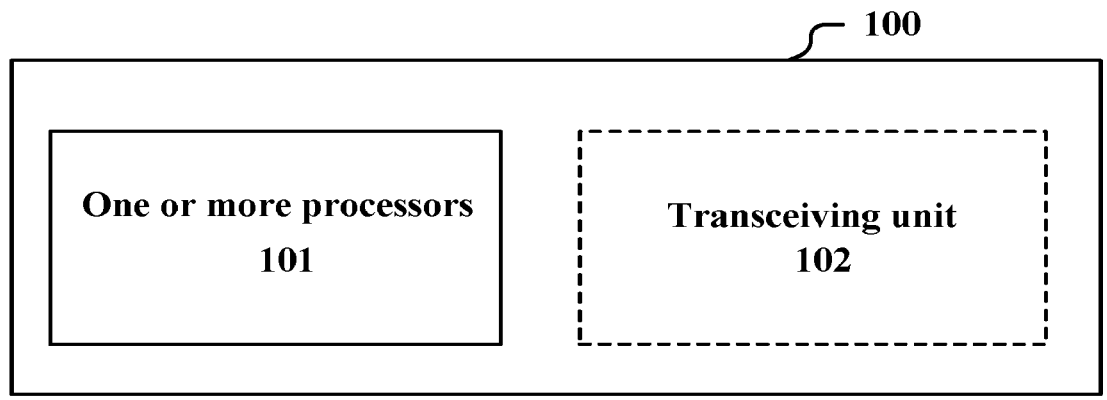
FIG. 1 is a block diagram illustrating a structure of an apparatus for wireless communications according to an embodiment of the present disclosure.

FIG. 1 illustrates a block diagram of a structure of an apparatus 100 for wireless communications according to an embodiment of the present disclosure. The apparatus 100 includes one or more processors 101 configured to: configure, based on an antenna configuration of a base station, downlink reference signals of the base station in a plurality of spatial dimensions respectively; and generate a control message containing an indication that the base station transmits the downlink reference signals in the plurality of spatial dimensions respectively, for use by a communication device served by the base station.

In the wireless communication system in which the apparatus 100 is located, the base station is provided with an antenna array with a plurality of spatial dimensions, for example, a two-dimensional antenna array having a horizontal direction and a vertical direction. Since the existing downlink reference signal is designed for only the one-dimensional antenna array, for example, for only the horizontal dimension in the MIMO system, it is necessary to perform additional configuration in order to acquire channel information in other dimensions. In addition, for example, considering the different transmission environments of the horizontal dimension and the vertical dimension, where in the horizontal dimension, the channel trends to be a scatter channel, while in the vertical dimension, the channel trends to a line-of-sight channel, a codebook defined for the horizontal dimension may probably be different from that defined for the vertical dimension. Therefore, it is necessary for a communication device such as a user equipment which needs to perform downlink channel measurement, estimation or demodulation to know whether a current downlink reference signal is for the horizontal dimension or the vertical dimension. In the apparatus 100 of this embodiment, spatial dimensions in which the downlink reference signals are to be transmitted are determined based on the antenna configuration, for example, distribution of spatial dimensions of the antenna array, of the base station, and configurations are performed on respective spatial dimensions, for example, a configuration compatible with the configuration for the horizontal dimension may be used. Correspondingly, a control message for indicating that the downlink reference signals are transmitted in multiple spatial dimensions respectively is generated, such that the user equipment served by the base station can know this point and correctly parse the received reference signals.

In the present embodiment and the following embodiments, the apparatus 100 may be implemented as a base station, and the base station may be realized as any type of evolved Node B (eNB) such as a macro eNB and a small eNB. The small eNB may be an eNB such as a pico eNB, a micro eNB, and a home (femto) eNB that covers a cell smaller than a macro cell. Instead, the base station may be realized as any other types of base stations such as a NodeB and a base transceiver station (BTS). The base station may include a main body (that is also referred to as a base station apparatus) configured to control radio communication, and one or more remote radio heads (RRH) disposed in a different place from the main body. In addition, various types of terminals, which will be described below, may each operate as the base station by temporarily or semi-persistently executing a base station function. In addition, the apparatus 100 may also be realized as any type of server such as a tower server, a rack server, and a blade server. The apparatus 100 may be a control module (such as an integrated circuit module including a single die, and a card or a blade that is inserted into a slot of a blade server) mounted on a server. For example, the communication system in which the apparatus 100 is located uses the C-RAN technology, and the apparatus 100 may be implemented as a server provided in the core network or on the baseband cloud. The apparatus 100 configures downlink reference signals in multiple spatial dimensions respectively based on the antenna configuration of RRH within the management scope thereof, and generates a control message containing an indication that the downlink reference signals are transmitted in multiple spatial dimensions and transmits it through RRH. In the following description, a case where the apparatus 100 is implemented as a base station is taken as an example for description primarily, and it should be understood that the scope of the present disclosure is not limited thereto.

The communication device served by the base station may be realized as a user equipment. The user equipment is, for example, a mobile terminal such as a smartphone, a tablet personal computer (PC), a notebook PC, a portable game terminal, a portable/dongle type mobile router, and a digital camera, or an in-vehicle terminal such as a car navigation apparatus served by the base station. The user equipment may also be realized as a terminal (that is also referred to as a machine type communication (MTC) terminal) that performs machine-to-machine (M2M) communication. Furthermore, the user equipment may be a radio communication module (such as an integrated circuit module including a single die) mounted on each of the above mentioned terminals.

In addition, in some optional examples, the communication device served/managed by the base station may be implemented as infrastructure such as a relay base station, a small eNB or the like which need to communicate with the base station through the radio interface and perform channel detection. In the following description, the user equipment is mainly described as an example, and it should be understood that the scope of the present disclosure is not limited thereto.

The processor 101 may be, for example, a central processing unit (CPU), a microprocessor, an integrated circuit module or the like which has data processing capability.

In addition, as shown by a dashed line block in FIG. 1, in an example of the apparatus 100 where the apparatus 100 is a base station, the apparatus 100 may further include a transceiving unit 102 configured to transmit, with respect to each of the plurality of spatial dimensions, a downlink reference signal in the spatial dimension to a user equipment, and receive a measurement feedback for the reference signal for the spatial dimension from the user equipment, respectively.

Figure 2:
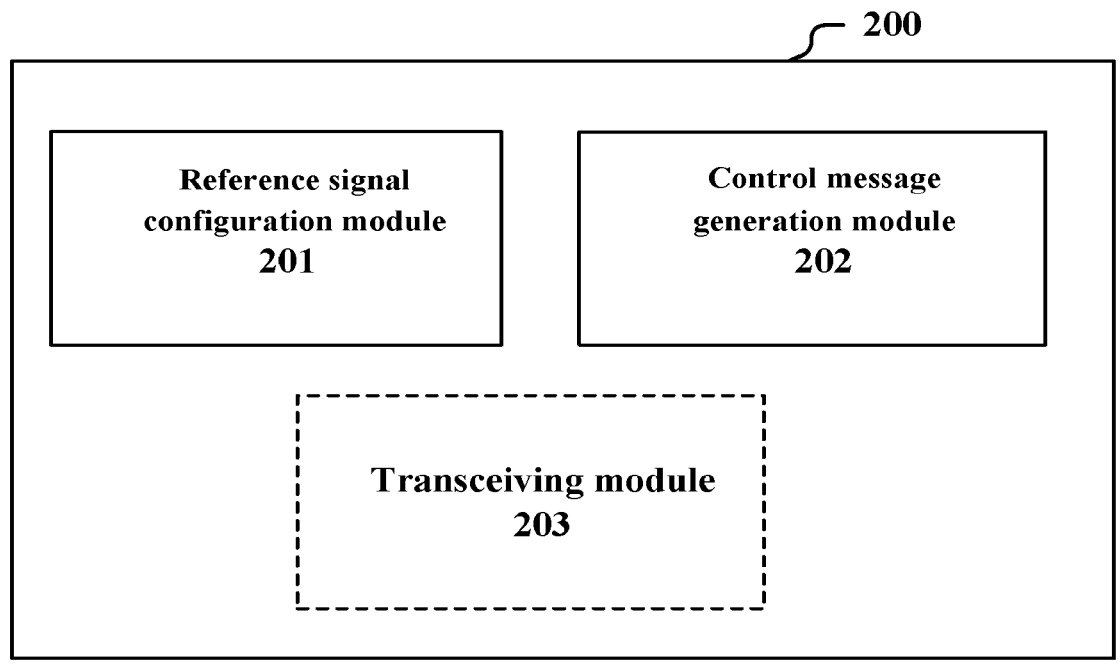
FIG. 2 is a block diagram illustrating a structure of a specific implementation of an apparatus for wireless communications according to an embodiment of the present disclosure.

Correspondingly, FIG. 2 illustrates a block diagram of a structure of a specific implementation of the apparatus 100 (which is identified as apparatus 200 in FIG. 2). In the following, the function and the structure of the apparatus 200 are described in detail with reference to this block diagram. As shown in FIG. 2, the apparatus 200 includes: a reference signal configuration module 201, configured to configure, based on an antenna configuration of the base station, downlink reference signals of the base station in a plurality of spatial dimensions respectively; and a control message generation module 202, configured to generate a control message containing an indication that the base station transmits the downlink reference signals in the plurality of spatial dimensions respectively, for use by a user equipment served by the base station.

In an example, the reference signal configuration module 201 configures the downlink reference signals in different spatial dimensions to be transmitted via different antenna ports respectively.

In order to enable the user equipment to distinguish the downlink reference signals in respective spatial dimensions, the reference signal configuration module 201 may map the downlink reference signals in different spatial dimensions into different transmission resources in a same pattern. The transmission resource corresponds to at least one of a sub-frame or a time slot. In other words, the downlink reference signals in different spatial dimensions are transmitted on different sub-frames or different time slots, such that the user equipment can determine the spatial dimension corresponding to the downlink reference signal based on a position of the sub-frame or the time slot.

Next, the control message generation module 202 contains, in the control message, the indication that the base station transmits the downlink reference signals in the plurality of spatial dimensions respectively. The indication may be reflected by, for example, defining a new transmission mode. The definition of this new transmission mode will be described in conjunction with specific application examples in the following.

In an example, the control message generation module 202 is further configured to contain, in the control message, a transmission parameter of the downlink reference signal in a specific spatial dimension by the base station and/or a measurement feedback parameter of the downlink reference signal in a specific spatial dimension by the user equipment. The transmission parameter and the measurement feedback parameter contained in the control message may be used by the user equipment to perform various operations, for example, to correctly parse the received downlink reference signals.

For example, the transmission parameter includes at least one of a reference signal port configuration parameter, a period configuration parameter and a sub-frame offset information corresponding to the specific spatial dimension, and the feedback parameter includes at least one of a measurement feedback period configuration parameter and sub-frame offset information configured for the user equipment to perform measurement feedback for the reference signal corresponding to the specific spatial dimension. The reference signal port configuration parameter may include the number of antenna ports and/or the antenna port numbers allocated to the reference signal in the corresponding spatial dimension, the period configuration parameter includes the transmission period of the downlink reference signal and the like, and the sub-frame offset information includes an offset amount of the downlink reference signal on the sub-frame and the like. The measurement feedback period configuration parameter and the sub-frame offset information may respectively include, for example, the transmission period and the offset on the sub-frame of the measurement feedback for the reference signal in a corresponding spatial dimension.

It should be noted that, the transmission parameter and the feedback parameter may include relevant parameters in all spatial dimensions, or relevant parameters in only some spatial dimensions. For example, in the case that the horizontal dimension and the vertical dimension are considered, for the horizontal dimension, the existing transmission parameter and the existing feedback parameter can be used, and thus only the transmission parameter and the feedback parameter for the vertical dimension are transmitted. Of course, this is only an example, and other manners man be adopted. For example, the base station side and the user equipment side may agree on the transmission parameter and the feedback parameter for each dimension in advance, so that it is not necessary to transmit these parameters for any dimension.

Transmission periods of the reference signals corresponding to respective spatial dimensions may be set to be different. Of course, transmission periods of the reference signals corresponding to respective spatial dimensions may be set to be the same as required. Similarly, measurement feedback periods of the reference signals corresponding to respective spatial dimensions may be set to be different, or may be set to be the same as required.

In addition, the measurement feedback may also be non-periodic, and may be performed, for example, by triggering the user equipment to perform feedback. For example, the base station instructs the user equipment to perform or not to perform the non-periodic measurement feedback with a CSI request domain contained in DCI information carried by PDCCH. It should be understood that, since the feedback manner is set separately for each spatial dimension, the following various configurations can be acquired for all of the spatial dimensions: the periodic measurement feedback can be configured for all spatial dimensions, with the feedback periods being identical; the periodic measurement feedback can be configured for all spatial dimensions, and not all of the feedback periods are identical or all of the feedback cycles are different; the periodic measurement feedback can be configured for only a part of spatial dimensions, and the non-periodic measurement feedback can be configured for the rest of spatial dimensions, where the feedback periods of the periodic feedback may be identical or different; and the non-periodic measurement feedback is configured for all spatial dimensions.

As can be seen, the configuration of the measurement feedback manner for the reference signal of the user equipment by the apparatus 200 of the present embodiment is very flexible.

As described above, in an example, the apparatus 200 may be a base station. As shown by a dashed line block in FIG. 2, the apparatus 200 may further include a transceiving module 203 configured to, for each of the plurality of spatial dimensions, transmit the downlink reference signal in the spatial dimension to the user equipment, and receive a measurement feedback for the reference signal for the spatial dimension from the user equipment, respectively.

In an example, the transceiving module 203 is configured to transmit the reference signals corresponding to respective spatial dimensions on different sub-frames, and receive measurement feedbacks corresponding to respective spatial dimensions on different sub-frames, such that the base station side can distinguish the spatial dimension corresponding to the received measurement feedback based on a position of the sub-frame of the received measurement feedback, and the user equipment side can distinguish the spatial dimension corresponding to the received reference signal based on a position of the sub-frame of the received downlink reference signal.

On reception of the downlink reference signals in multiple dimensions, the user equipment maps the downlink reference signals with the spatial dimensions according to the positions of the sub-frames, performs corresponding measurements, and then feeds back measurement results of respective spatial dimensions on different sub-frames in accordance with the feedback parameter in the control message.

As an example, the measurement feedback for the reference signal includes channel estimation information acquired based on the reference signal, which includes but is not limited to measured intensity values such as channel quality indication (CQI), pre-coding matrix indication (PMI), rank indication (RI), and reference signal reception power (RSRP). As mentioned above, the measurement feedback may be periodic or non-periodic, and the manner thereof may be set differently for different spatial dimensions.

The transceiving module 203 may receive periodic measurement feedback results via a physical uplink control channel (PUCCH) or a physical uplink data channel (PUSCH). In addition, in an example, the transceiving module 203 receives the measurement feedback for the reference signals corresponding to a part of the plurality of spatial dimensions via only the physical uplink data channel (PUSCH). For example, in the case that the measurement feedback is non-periodic, the transceiving module 203 receives the measurement feedback results via only the PUSCH.

In the case that the non-periodic feedback manner is configured for at least a part of spatial dimensions, the control message generation module 202 is further configured to contain a non-periodic measurement feedback request for the reference signal corresponding to a specific spatial dimension in downlink control information (DCI) or a random access response (RAR), for use by the user equipment. On reception of the non-periodic measurement feedback request, the user equipment performs non-periodic measurement feedback on the reference signal corresponding to the specific spatial dimension contained in the request.

As an example, the transceiving module 203 is configured to receive the measurement feedback for the reference signal corresponding to a second spatial dimension on a first available uplink sub-frame after an uplink sub-frame for the measurement feedback for the reference signal corresponding to a first spatial dimension. Of course, the present disclosure is not limited thereto, and the above measurement feedback may be received on a second, third, etc. available uplink sub-frame. However, it should be understood that the closer the sub-frame of the feedback is, the better the real-time performance is, and the more accurate the feedback information is.

In summary, the apparatuses 100 and 200 are capable of respectively configuring the downlink reference signals in multiple spatial dimensions and the measurement feedback thereof, thereby achieving acquisition of the channel information in multiple spatial dimensions, and thus improving the system performance.

Second Embodiment

In this embodiment, the downlink reference signal is a channel status information reference signal (CSI-RS), and the control message is radio resource control (RRC) signaling. For example, the plurality of spatial dimensions include a horizontal direction and a vertical direction.

In the prior art, the CSI-RS is configured only for the horizontal direction, and the corresponding RRC signaling is only defined for the horizontal direction. Therefore, it is necessary to redefine the CSI-RS and the RRC signaling in the presence of two spatial dimensions including the horizontal direction and the vertical direction.

The reference signal configuration module 201 is configured to configure a first antenna port set for a horizontal CSI-RS (H-CSI-RS), and configure a second antenna port set for a vertical CSI-RS (V-CSI-RS). The first antenna port set and the second antenna port set each includes 8 different antenna ports. For example, as compared with the conventional technology, the transmission antenna ports for the horizontal CSI-RS are unchanged, and 8 antenna ports are additionally provided for transmitting the vertical CSI-RS.

In an example, the control message generation module 202 is configured to contain an indication that the base station transmits the CSI-RS in a horizontal spatial dimension and in a vertical spatial dimension in the RRC signaling in a form of transmission mode information element.

Existing transmission modes 1 to 10 support only up to 8 CSI-RS antenna ports. Therefore, in the present disclosure, a new transmission mode 11 which supports 16 CSI-RS antenna ports is designed, where 8 antenna ports are used for transmitting the H-CSI-RS (for example, may be the same as the 8 antenna ports of the existing transmission modes), and the rest 8 antenna ports are used for transmitting the V-CSI-RS.

FIG. 3 illustrates an example of a signaling flow chart regarding CSI-RS transmission and CSI feedback to which the present disclosure is applied. As shown in FIG. 3, the user equipment (UE) side first transmits a RRC connection request to the base station (BS) side. Next, the base station side transmits a RRC connection setup instruction to the user equipment side. After confirmation, the user equipment side transmits a RRC connection setup complete instruction to the base station side. After the RRC connection is completed, the base station side periodically transmits CSI-RS in two dimensions to the user equipment side. The user equipment side calculates the CSI in two dimensions based on the CSI-RS and feeds it back to the base station side.

Specific signaling information associated with the present disclosure generated by the base station side is listed in the following. For example, the base station side:

① contains the transmission mode tm11 in the parameter transmissionMode-r10 in AntennaInfoDedicated-r10;

② contains the enumeration type an16 (which indicates that 16 CSI-RS antenna ports are used) in the parameter antennaPortsCount-r13 in CSI-RS config-r13;

③ generates the sub-frame configuration information of the H-CSI-RS and the V-CSI-RS; and ④ generates the feedback configuration information of the H-CSI and the V-CSI.

The existing CSI-RS is transmitted through only 1, 2, 4 or 8 antenna ports, and the used port numbers are p=15; p=15, 16; p=15, . . . , 18 and p=15, . . . , 22 respectively. In the present disclosure, antenna port numbers for transmitting V-CSI-RS are denoted as $p_1, p_2, \ldots,$ and $p_8$. For example, according to existing LTE standards of the 3GPP, the reference signal $r_{l,n_s}^{(m)}$ corresponding to the port p needs to be mapped to a complex modulation symbol $a_{k,l}^{(p)}$, and the mapping rule is expressed by the following equation (1):

$$a_{k,l}^{(p)} = w_{l''} \cdot r_{l,n_s}(m') \quad (1)$$

The other parameters in the equation (1) have the same definitions as those in the existing standards. In the present disclosure, the antenna ports $p_1, p_2, \ldots,$ and $p_8$ are added into the mapping relationship, as expressed by the following equation (2):

$$k = k' + 12m + \begin{cases} -0 & \text{for } p \in \{15, 16, p_1, p_2\}, \text{ normal cyclic prefix} \\ -6 & \text{for } p \in \{17, 18, p_3, p_4\}, \text{ normal cyclic prefix} \\ -1 & \text{for } p \in \{19, 20, p_5, p_6\}, \text{ normal cyclic prefix} \\ -7 & \text{for } p \in \{21, 22, p_7, p_8\}, \text{ normal cyclic prefix} \\ -0 & \text{for } p \in \{15, 16, p_1, p_2\}, \text{ extended cyclic prefix} \\ -3 & \text{for } p \in \{17, 18, p_3, p_4\}, \text{ extended cyclic prefix} \\ -6 & \text{for } p \in \{19, 20, p_5, p_6\}, \text{ extended cyclic prefix} \\ -9 & \text{for } p \in \{21, 22, p_7, p_8\}, \text{ extended cyclic prefix} \end{cases} \quad (2)$$

$$w_{l''} = \begin{cases} 1 & p \in \{15, 17, 19, 21, p_1, p_3, p_5, p_7\} \\ (-1)^{l''} & p \in \{16, 18, 20, 22, p_2, p_4, p_6, p_8\} \end{cases}$$

The CSI-RS in the vertical dimension (corresponding to ports $p_1, p_2, \ldots,$ and $p_8$) and the CSI-RS in the horizontal dimension (corresponding to ports 15, . . . , 22) are mapped to different transmission resources in a same pattern, such that the user equipment can distinguish the CSI-RS in the vertical dimension and the CSI-RS in the horizontal dimension. The transmission resource corresponds to at least one of the sub-frame and the time slot. Specifically, the CSI-RS in the vertical dimension and the CSI-RS in the horizontal dimension have a same mapping pattern in the resource block map, but are transmitted in different sub-frames or time slots, thereby avoiding confusion.

In addition, the user equipment side needs to know transmission timings such as positions of sub-frames of the CSI-RSs in respective dimensions, thereby correctly acquiring the CSI-RS in respective dimensions for performing CSI feedback. In an example, the control message generation module 202 indicates configuration of the transmission timings of reference signals in different dimensions using the parameter SubframeConfig ($I_{CSI-RS}$) in CSI-RS-Config of the RRC signaling. The reference signals in different dimensions have different value ranges for the parameter SubframeConfig.

FIG. 4 illustrates an example of sub-frame configuration of the H-CSI-RS and the V-CSI-RS. A correspondence between the $I_{CSI-RS}$ and the CSI-RS period as well as the CSI-RS sub-frame offset is illustrated in the table shown in FIG. 4, where the part regarding the H-CSI-RS is defined in existing standards, and the part regarding the V-CSI-RS is newly added. As can be seen, as compared with the existing standards, the range of $I_{CSI-RS}$ is extended in the present disclosure.

This table is, for example, stored on both the base station side and the user equipment side in advance meanwhile. When the user equipment side receives the RRC signaling and parses the parameter SubframeConfig in CSI-RS-Config, i.e., the $I_{CSI-RS}$, from the RRC signaling, the user equipment looks up the table using this value, thereby acquiring a corresponding CSI-RS period and CSI-RS sub-frame offset. Since the horizontal dimension and the vertical dimension have different value ranges for the $I_{CSI-RS}$, it can be distinguished whether the $I_{CSI-RS}$ corresponds to the horizontal dimension or the vertical dimension according to the specific value.

The H-CSI-RS and the V-CSI-RS may have a same transmission period or different transmission periods. However, it is required that the H-CSI-RS and the V-CSI-RS are transmitted in different sub-frames, which may be implemented by setting appropriate $I_{CSI-RS,H}$ and $I_{CSI-RS,V}$.

For example, in the case that the H-CSI-RS and the V-CSI-RS are configured to have the same transmission period, for example, the period $T_{CSI-RS}=5$ ms, $I_{CSI-RS,H}$ is set to 0, and $I_{CSI-RS,V}$ is set to 156, the H-CSI-RS is transmitted on sub-frames 0, 5, 10, . . . , and the V-CSI-RS is transmitted on sub-frames 1, 6 and 11, as shown in FIG. 5. More generally, in the case that the H-CSI-RS and the V-CSI-RS are configured to have the same transmission period, respective sub-frame offsets $\Delta_{CSI-RS,H}$ of the H-CSI-RS and $\Delta_{CSI-RS,V}$ of the V-CSI-RS need to satisfy the following condition:

$$\Delta_{CSI-RS,H} + a \cdot T_{CSI-RS} \neq \Delta_{CSI-RS,V} + b \cdot T_{CSI-RS} \quad (3)$$

where a and b are both positive integers. In other words, the inequality (3) ensures that the H-CSI-RS and the V-CSI-RS have different sub-frame positions.

In another aspect, in the case that the H-CSI-RS and the V-CSI-RS are configured to have different transmission periods, for example, the transmission period for H-CSI-RS $T_{CSI-RS,H}=5$ ms, the transmission period for V-CSI-RS $T_{CSI-RS,V}=20$ ms, and $I_{CSI-RS,H}$ is set to 1, the sub-frame offset $\Delta_{CSI-RS,V}$ of the V-CSI-RS needs to satisfy the following condition:

$$\Delta_{CSI-RS,H} + c \cdot T_{CSI-RS,H} \neq \Delta_{CSI-RS,V} + d \cdot T_{CSI-RS,V} \quad (4)$$

where c and d are both positive integers. The above inequality (4) can be reduced to the following inequality (5):

$$1 + 5c \neq \Delta_{CSI-RS,V} + 20d \quad (5)$$

Therefore, $\Delta_{CSI-RS,V} \neq 1+5c-20d$. In addition, since (1+5c−20d) mod 5=1, $\Delta_{CSI-RS,V}$ needs to satisfy the following inequality (6):

$$\Delta_{CSI-RS,V} \bmod 5 \neq 1 \quad (6)$$

It should be understood that the above is only an example, and other sub-frame configurations may be performed on the H-CSI-RS and the V-CSI-RS. By transmitting the H-CSI-RS and the V-CSI-RS on different sub-frames, the user equipment side can determine, according to the position of the sub-frame carrying the CSI-RS, whether the H-CSI-RS or the V-CSI-RS is received, without requiring additional indications, thereby reducing the signaling overhead.

In addition, relevant parameters for the user equipment to perform CSI feedback are also required to be set on the base station side and provided to the user equipment. In an example, the control message generation module 202 may indicate configuration of channel status information feedback by the user equipment with respect to the horizontal spatial dimension and the vertical spatial dimension using a parameter cqi-pmi-ConfigIndex ($I_{CQI/PMI}$) in the RRC signaling. A value of the parameter cqi-pmi-ConfigIndex corresponding to the configuration of the channel status information feedback for the vertical spatial dimension is different from that for the horizontal spatial dimension.

In existing standards, periodic CSI feedback is defined. In a FDD system, for example, a mapping relationship of $I_{CQI/PMI}$ with the feedback period $N_{pd}$ and the feedback sub-frame offset $N_{OFFSET,CQI}$ is shown in FIG. 6. As can be seen from FIG. 6, the part $542 \leq I_{CQI/PMI} \leq 1023$ is not used. Therefore, in the present disclosure, these reversed values are used for indicating the $I_{CQI/PMI}$ for the vertical dimension and the mapping relationship of $I_{CQI/PMI}$ for the vertical dimension with $N_{pd}$ and $N_{OFFSET,CQI}$, as shown in FIGS. 7 and 8, for example, which respectively correspond to the FDD system and the TDD system.

The table in FIG. 7 or FIG. 8 is stored on both the base station side and the user equipment side. When the user equipment side receives the RRC signaling and parses the parameter cqi-pmi-ConfigIndex from the RRC signaling, the user equipment looks up the table to acquire a corresponding $N_{pd}$ and $N_{OFFSET,CQI}$, and feeds back the CSI in a corresponding spatial dimension using the acquired period and sub-frame offset.

The H-CSI and the V-CSI may have a same feedback period or different feedback periods, but should be fed back on different sub-frames. A case where the H-CSI and the V-CSI are fed back on a same sub-frame may be avoided by selecting appropriate $I_{CQI/PMI,H}$ and $I_{CQI/PMI,V}$.

In addition, non-periodic feedback of the CSI can also be configured. For example, in the case that a CSI request domain in the DCI includes corresponding information bits, the user equipment performs non-periodic feedback of the CSI for the dimension.

Correspondingly, the base station side may transmit a request of non-periodic CSI feedback through downlink control information (DCI) or a random access response (RAR). For example, whether to trigger non-periodic CSI feedback may be indicated with a CSI request field in the DCI format 0/4. In existing standards, the CSI request field includes 1 or 2 bits, where the CSI request field of 2 bits is applicable to only a case where more than one downlink cell is configured, and a corresponding DCI format is mapped to a receiver in a UE specific search space provided by C-RNTI, and thus only one bit can be used for indicating the non-periodic CSI feedback. In other words, the CSI request field in the existing standards can be used for indicating only two states (0 or 1). Therefore, it is specified that the two states respectively correspond to the non-periodic feedback being triggered for both the horizontal dimension and the vertical dimension, and the non-periodic feedback being triggered for none of the horizontal dimension and the vertical dimension. Of course, the case is not limited thereto. For example, it may also be specified that the two states respectively correspond to the non-periodic feedback being triggered for the vertical dimension; and the non-periodic feedback being triggered for the horizontal dimension (or vice versa). The advantage of this manner is that no additional CSI request field is required.

In addition, 1 bit may be added to the CSI request filed, for example, for indicating various combinations of feedback manners for the horizontal direction and the vertical direction. FIG. 9 and FIG. 10 respectively illustrates states respectively corresponding to the 2-bit CSI request field and the 3-bit CSI request field after adding. Since 2 bits are used to describe whether the periodic CSI feedback is performed in the horizontal direction and the vertical direction, this scheme covers all the possibilities, such that the base station side can configure the triggering of non-periodic feedback more flexibly.

If it is configured that the non-periodic CSI feedback is performed in the vertical direction, the V-CSI may be transmitted on a first available uplink sub-frame after the CSI feedback in the horizontal direction. It is to be noted that, the non-periodic CSI feedback or the periodic CSI feedback may be performed in the horizontal direction, and if the periodic CSI feedback is performed in the horizontal direction, the feedback sub-frame configuration specified in existing 3GPP standards may be used for the horizontal direction.

The apparatus 100 (or 200) according to this embodiment implements configurations of the CSI-RS and the feedback for the CSI-RS in the horizontal dimension and the vertical dimension on the basis of existing standards, thereby implementing estimation and feedback of horizontal channel information and vertical channel information at low overhead and complexity.

Third Embodiment

FIG. 11 illustrates a block diagram of a structure of an apparatus 300 for wireless communications according to an embodiment of the present disclosure. The apparatus 300 includes one or more processors 301 configured to determine, based on a control message from a base station, that the base station transmits downlink reference signals in a plurality of spatial dimensions respectively; and measure, in response to a measurement indication from the base station, the downlink reference signals in respective spatial dimensions and generate measurement feedback information for respective spatial dimensions.

The apparatus 300 may be a user equipment, which is, for example, a mobile terminal such as a smartphone, a tablet personal computer (PC), a notebook PC, a portable game terminal, a portable/dongle type mobile router, and a digital camera, or an in-vehicle terminal such as a car navigation apparatus served by the base station. The user equipment may also be realized as a terminal (that is also referred to as a machine type communication (MTC) terminal) that performs machine-to-machine (M2M) communication. Furthermore, the user equipment may be a radio communication module (such as an integrated circuit module including a single die) mounted on each of the above mentioned terminals. The description of the base station is as described in the first embodiment and is not repeated here.

In addition, in the case that another communication device such as a relay base station or a small base station need to acquire the channel information of the channel from the communication device to the above mentioned base station, it may also be regarded as the user equipment described here.

The processor 301 may be, for example, a central processing unit (CPU), a microprocessor, an integrated circuit module or the like which has data processing capability.

In addition, in an example, as shown by a dashed line block in FIG. 11, the apparatus 300 may also include a transceiving unit 302 configured to, for each of the plurality of spatial dimensions, receive the downlink reference signal in the spatial dimension from the base station, and transmit a measurement feedback for the reference signal corresponding to the spatial dimension to the base station, respectively.

Figure 12:
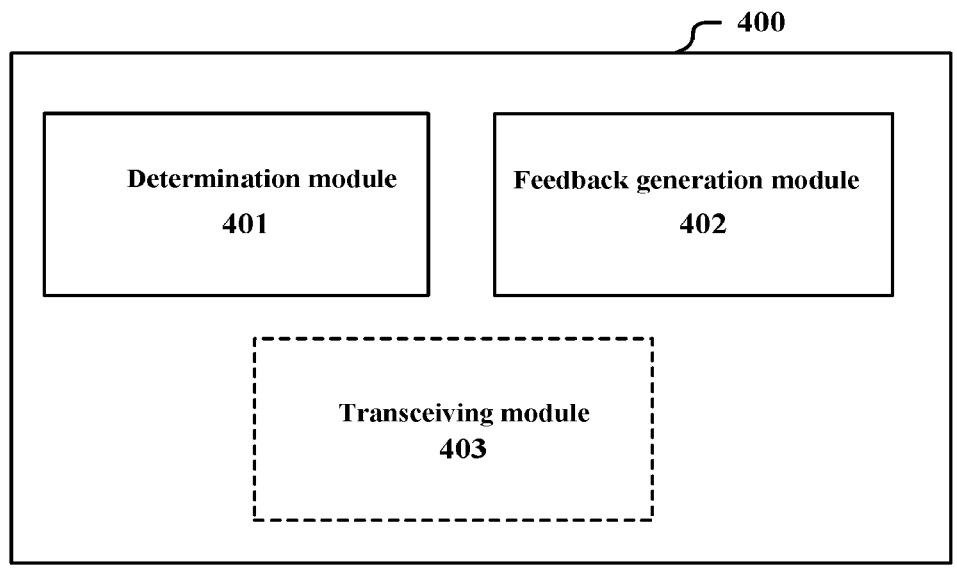
FIG. 12 is a block diagram illustrating a structure of a specific implementation of an apparatus for wireless communications according to an embodiment of the present disclosure.

Correspondingly, FIG. 12 illustrates a block diagram of a structure of a specific example of the apparatus 300 (which is identified as apparatus 400 in FIG. 12). In the following, the function and the structure of the apparatus 400 are described in detail with reference to this block diagram. As shown in FIG. 12, the apparatus 400 includes: a determination module 401, configured to determine, based on a control message from a base station, that the base station transmits downlink reference signals in a plurality of spatial dimensions respectively; and a feedback generation module 402, configured to measure, in response to a measurement indication from the base station, the downlink reference signals in respective spatial dimensions and generate measurement feedback information for respective spatial dimensions.

The control information contains information for indicating the user equipment that the base station is to transmit the downlink reference signals in multiple spatial dimensions, such that the user equipment can correctly parse the measurement indication from the base station so as to perform correct measurement and feedback.

In an example, the control message includes a transmission parameter of the downlink reference signal in a specific spatial dimension by the base station and/or a measurement feedback parameter of the downlink reference signal in the specific spatial dimension by the apparatus. For example, the transmission parameter may include at least one of a reference signal port configuration parameter, a period configuration parameter and sub-frame offset information corresponding to the specific spatial dimension, and the measurement feedback parameter can include at least one of a measurement feedback period configuration parameter and sub-frame offset information configured for the apparatus to perform measurement feedback of the reference signal corresponding to the specific spatial dimension. As described in the first embodiment, the reference signal port configuration parameter may include the number of antenna ports and/or the antenna port numbers allocated to the reference signal in the corresponding spatial dimension, the period configuration parameter includes the transmission period of the downlink reference signal and the like, and the sub-frame offset information includes an offset amount of the downlink reference signal on the sub-frame and the like. The measurement feedback period configuration parameter and the sub-frame offset information may respectively include, for example, the transmission period and the offset on the sub-frame of the measurement feedback for the reference signal in the corresponding spatial dimension. Similarly, the transmission parameter and the feedback parameter may include relevant parameters in all spatial dimensions, or relevant parameters in only some spatial dimensions, which may be selected depending on requirements and conditions of actual application.

Transmission periods of the reference signals corresponding to respective spatial dimensions may be set to be different, or may be set to be the same as required, of course. Similarly, the measurement feedback periods of the reference signals corresponding to respective spatial dimensions may be set to be different, or may be set to be the same as required.

In addition, the measurement feedback may also be non-periodic, and may be performed, for example, by triggering the user equipment to perform feedback. For example, the user equipment may determine, according to a CSI request domain in DCI information carried by PDCCH from the base station, to perform or not to perform non-periodic measurement feedback. It should be understood that, since the feedback manner and the feedback period of the periodic feedback are set separately for each spatial dimension, for all spatial dimensions, any combination of all settings on respective spatial dimensions can be acquired. That is, the apparatus 400 of the present embodiment can support a flexible and diverse reference signal measurement feedback manner.

As can be seen, based on the transmission parameter and the feedback parameter, the user equipment can acquire the correspondence between the downlink reference signal and the spatial dimension, and the sub-frame configuration scheme to be adopted for different spatial dimensions when transmitting the feedback. In this way, on reception of the downlink reference signal, the user equipment can correctly parse the downlink reference signal and perform measurement feedback.

In an example, the determination module 401 is configured to determine, according to difference in transmission resources carrying downlink reference signals with a same pattern, a spatial dimension corresponding to a downlink reference signal. The transmission resource corresponds to at least one of a sub-frame or a time slot. As described above, the downlink reference signals in different spatial dimensions correspond to different transmission resources. This correspondence may be known by the user equipment and the base station in advance, for example, and the base station transmits the downlink reference signals according to the correspondence. The determination module 401 on the user equipment side determines the spatial dimensions corresponding to respective downlink reference signals according to the correspondence. For example, the determination module 401 may determine the spatial dimension corresponding to the downlink reference signal according to a position of a sub-frame carrying the downlink reference signal.

As described above, in an example, the apparatus 400 may be a user equipment, as shown by a dashed line block in FIG. 12. The apparatus 400 may further include a transceiving module 403 configured to, for each of the plurality of spatial dimensions, receive the downlink reference signal in the spatial dimension from the base station, and transmit a measurement feedback for the reference signal corresponding to the spatial dimension to the base station, respectively.

In an example, the transceiving module 403 is configured to receive the reference signals corresponding to respective spatial dimensions on different sub-frames, and transmit the measurement feedbacks corresponding to respective spatial dimensions on different sub-frames.

As described above, the measurement feedback for the reference signal includes channel estimation information acquired based on the reference signal, which includes but is not limited to measured intensity values such as channel quality indication (CQI), pre-coding matrix indication (PMI), rank indication (RI), and reference signal reception power (RSRP). The measurement feedback may be periodic or non-periodic, and the manner thereof may be set differently for different spatial dimensions. The feedback manner is set by the base station and informed to the user equipment with, for example, a control message. In other words, the determination module 401 determines measurement feedback configurations for respective spatial dimensions according to the control message, and the feedback generation module 402 and the transceiving module 403 perform generation and transmission of the measurement feedback information according to the configuration.

The transceiving module 403 may transmit periodic measurement feedback results via a physical uplink control channel (PUCCH) or a physical uplink data channel (PUSCH). In addition, in an example, the transceiving module 403 transmits the measurement feedbacks for the reference signals corresponding to a part of the multiple spatial dimensions via only the physical uplink data channel (PUSCH). For example, in the case that the measurement feedbacks are non-periodic, the transceiving module 403 transmits the measurement feedback results via only the PUSCH.

In an example, the transceiving module 403 further receives downlink control information (DCI) or a random access response (RAR) containing a non-periodic measurement feedback request for the reference signal corresponding to a specific spatial dimension. On reception of the non-periodic measurement feedback request, the user equipment performs non-periodic measurement feedback on the reference signal corresponding to the specific spatial dimension contained in the request.

The transceiving module 403 may be configured to transmit the measurement feedback for the reference signal corresponding to a second spatial dimension on a first available uplink sub-frame after an uplink sub-frame for the measurement feedback for the reference signal corresponding to a first spatial dimension. Of course, the present disclosure is not limited thereto, and the above measurement feedback may be transmitted on a second, third, etc. available uplink sub-frame. However, it should be understood that the closer the sub-frame of the feedback is, the better the real-time performance is, and the more accurate the feedback information is.

In summary, the apparatus 300 and 400 can support measurement feedback for downlink reference signals in multiple spatial dimensions, thereby implementing acquisition of the channel information in multiple spatial dimensions, and thus improving the system performance.

In an example, the downlink reference signal is a channel status information reference signal (CSI-RS), and the control message is radio resource control (RRC) signaling. For example, the multiple spatial dimensions include a horizontal direction and a vertical direction. As described above, in the conventional technology, the CSI-RS is configured for only the horizontal direction, and the corresponding RRC signaling is defined for only the horizontal direction. Therefore, it is necessary to redefine the CSI-RS and the RRC signaling in the presence of two spatial dimensions including the horizontal direction and the vertical direction.

The RRC signaling contains an indication that the base station transmits the CSI-RS in the horizontal spatial dimension and the vertical spatial dimension in a form of transmission mode information element. As an example, a parameter cqi-pmi-ConfigIndex in the RRC signaling is used for indicating configuration of channel status information feedback by the apparatus 400 with respect to the horizontal spatial dimension and the vertical spatial dimension. A value range of the parameter cqi-pmi-ConfigIndex corresponding to the configuration of channel status information feedback for the vertical spatial dimension is different from that for the horizontal spatial dimension. In addition, a parameter SubframeConfig in CSI-RS-Config in the RRC signaling indicates configuration of transmission timings of reference signals in different dimensions. The reference signals in different dimensions have different value ranges for the parameter SubframeConfig.

The configuration of the CSI-RS, the configuration of the CSI feedback and the setting of the RRC signaling are described in detail in the second embodiment, and are not repeated here.

It is to be noted that, embodiments of specific signaling, procedures and the like of the case where the present disclosure is applied to the LTE system are mainly described by means of example. However, it should be understood that, the present disclosure is also applicable to various other communication systems to which the MIMO technology can be applied, such as wimax, thereby implementing reference signal configuration, channel information feedback and the like in multiple dimensions.

Fourth Embodiment

In the process of describing the apparatus for wireless communications in the embodiments described above, obviously, some processing and methods are also disclosed. Hereinafter, an overview of the methods is given without repeating some details disclosed above. However, it should be noted that, although the methods are disclosed in a process of describing the apparatus for wireless communications, the methods do not certainly employ or are not certainly executed by the aforementioned components. For example, the embodiments of the apparatus for wireless communications may be partially or completely implemented with hardware and/or firmware, the method for wireless communications described below may be executed by a computer-executable program completely, although the hardware and/or firmware of the electronic device can also be used in the methods.

Figure 13:
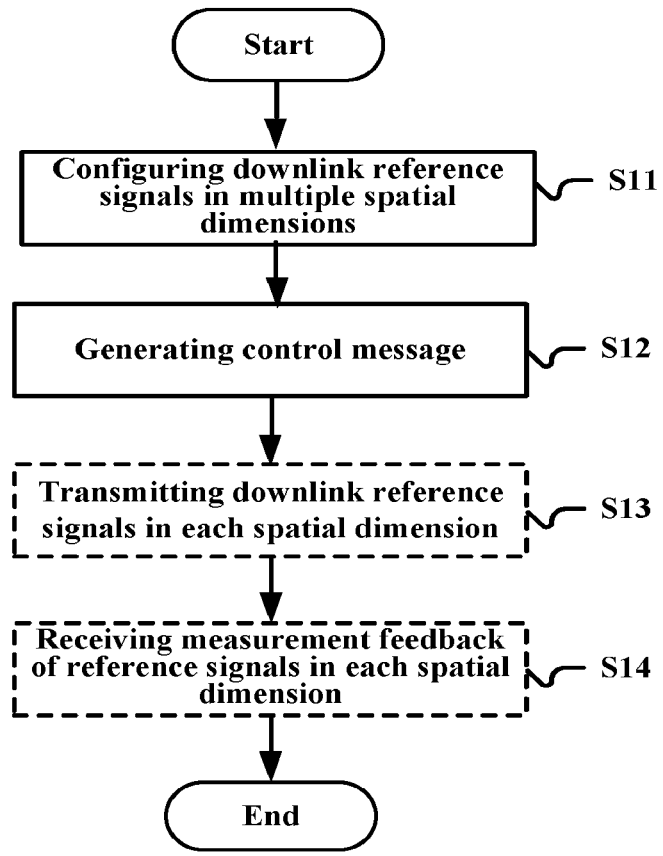
FIG. 13 is a flow chart illustrating a method for wireless communications according to an embodiment of the present disclosure.

FIG. 13 illustrates is a flow chart of a method for wireless communications according to an embodiment of the present disclosure. The method includes: configuring, based on an antenna configuration of a base station, downlink reference signals of the base station in a plurality of spatial dimensions respectively (S11); and generating a control message containing an indication that the base station transmits the downlink reference signals in the plurality of spatial dimensions respectively, for use by a communication device served by the base station (S12).

In step S11, the downlink reference signals in different spatial dimensions may be configured to be transmitted via different antenna ports respectively. The downlink reference signals in different spatial dimensions may be mapped into different transmission resources in a same pattern, to enable the communication device to distinguish the downlink reference signals in respective spatial dimensions. The transmission resource corresponds to at least one of a sub-frame or a time slot. The communication device can distinguish the downlink reference signals corresponding to different spatial dimensions by transmitting the downlink reference signals in different spatial dimensions using different transmission resources.

In step S12, a transmission parameter of the downlink reference signal in a specific spatial dimension by the base station and/or a measurement feedback parameter of the downlink reference signal in a specific spatial dimension by the communication device may be contained in the control message. For example, the transmission parameter may include at least one of a reference signal port configuration parameter, a period configuration parameter and sub-frame offset information corresponding to the specific spatial dimension, and the measurement feedback parameter may include at least one of a measurement feedback period configuration parameter and sub-frame offset information configured for the communication device to perform measurement feedback for the reference signal corresponding to the specific spatial dimension. The transmission periods of reference signals corresponding to respective spatial dimensions may be set to be different. The measurement feedback periods of reference signals corresponding to respective spatial dimensions may be set to be different. Of course, the transmission periods and/or the feedback periods may be set to be the same.

In an example, the above method is executed at the base station, as shown in the dashed line box in FIG. 13. In this case, the method may include the following steps: for each of the plurality of spatial dimensions, transmitting the downlink reference signal in the spatial dimension to the communication device respectively (S13), and receiving a measurement feedback for the reference signal for the spatial dimension from the communication device (S14).

In step S13, the reference signals corresponding to respective spatial dimensions are transmitted on different sub-frames. In step S14, the measurement feedbacks corresponding to respective spatial dimensions are received on different sub-frames.

In an example, in step S14, the measurement feedbacks for the reference signals corresponding to a part of the plurality of spatial dimensions are received via only a physical uplink data channel (PUSCH). In step S12, a non-periodic measurement feedback request for the reference signal corresponding to a specific spatial dimension is contained in downlink control information or a random access response for use by the communication device. As described above, for a periodic measurement feedback, the measurement feedback result may be received via the PUCCH or the PUSCH.

In step S14, the measurement feedback for the reference signal corresponding to a second spatial dimension may be received on a first available uplink sub-frame after an uplink sub-frame for the measurement feedback for the reference signal corresponding to a first spatial dimension.

As an example, the downlink reference signal may be a channel status information reference signal (CSI-RS), and the control message may be radio resource control (RRC) signaling. The plurality of spatial dimensions may include a horizontal direction and a vertical direction.

In this case, in step S11, a first antenna port set is configured for a horizontal channel status information reference signal, and a second antenna port set is configured for a vertical channel status information reference signal. The first antenna port set and the second antenna port set each includes 8 different antenna ports.

In step S12, an indication that the base station transmits the CSI-RS in the horizontal spatial dimension and in the vertical spatial dimension in contained in the RRC signaling in a form of transmission mode information element.

In addition, in step S12, the configuration of a channel status information feedback by the communication device with respect to the horizontal spatial dimension and the vertical spatial dimension is indicated using a parameter cqi-pmi-ConfigIndex in the RRC signaling. A value of the parameter cqi-pmi-ConfigIndex corresponding to the configuration of the channel status information feedback for the vertical spatial dimension is different from that for the horizontal spatial dimension.

In step S12, configuration of transmission timings for the reference signals in different dimensions is indicated using a parameter SubframeConfig in CSI-RS-Config of the RRC signaling. The reference signals in different dimensions have different value ranges for the parameter SubframeConfig.

Figure 14:
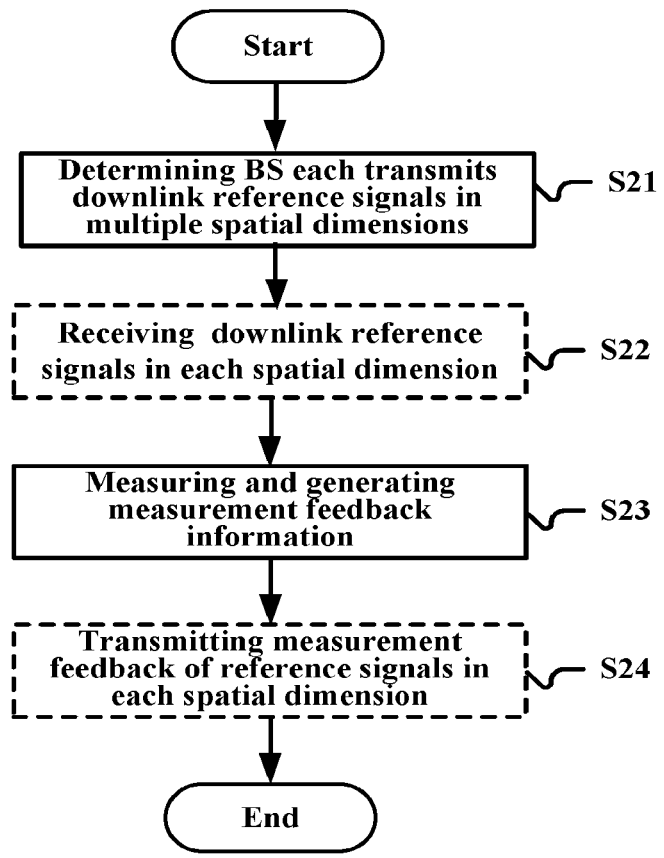
FIG. 14 is a flow chart illustrating a method for wireless communications according to an embodiment of the present disclosure.

FIG. 14 illustrates is a flow chart of a method for wireless communications according to another embodiment of the present disclosure. The method includes: determining, based on a control message from a base station, that the base station transmits downlink reference signals in a plurality of spatial dimensions (S21); and measuring, in response to a measurement indication from the base station, the downlink reference signals in respective spatial dimensions and generating measurement feedback information for respective spatial dimensions (S23).

The control message may include a transmission parameter of the downlink reference signal in a specific spatial dimension by the base station and/or a measurement feedback parameter of the downlink reference signal in a specific spatial dimension by the user equipment. For example, the transmission parameter may include at least one of a reference signal port configuration parameter, a period configuration parameter and sub-frame offset information corresponding to the specific spatial dimension, and the measurement feedback parameter may include at least one of a measurement feedback period configuration parameter and sub-frame offset information configured for the user equipment to perform measurement feedback of the reference signal corresponding to the specific spatial dimension. The transmission periods for reference signals corresponding to respective spatial dimensions may be set to be different. The measurement feedback periods for reference signals corresponding to respective spatial dimensions may be set to be different. Of course, the transmission periods and/or the feedback periods may be set to be the same.

In step S21, a spatial dimension corresponding to a downlink reference signal can be determined according to difference in transmission resources carrying downlink reference signals with a same pattern. The transmission resource corresponds to at least one of a sub-frame or a time slot. For example, the spatial dimension corresponding to the downlink reference signal may be determined according to a position of a sub-frame carrying the downlink reference signal.

In an example, the above method may be executed by the user equipment, as shown in the dashed line box in FIG. 14. In this case, the method may further include the following steps: for each of the plurality of spatial dimensions, receiving the downlink reference signal in the spatial dimension from the base station (S22), and transmitting a measurement feedback for the reference signal corresponding to the spatial dimension to the base station (S24).

In step S22, the reference signals corresponding to respective spatial dimensions are received on different sub-frames. In step S24, the measurement feedbacks corresponding to respective spatial dimensions are transmitted on different sub-frames.

For example, in step S24, the measurement feedbacks for the reference signals corresponding to a part of the plurality of spatial dimensions are transmitted via only a physical uplink data channel, and in step S22, downlink control information or a random access response containing a non-periodic measurement feedback request for the reference signal corresponding to a specific spatial dimension is received. As described above, for the periodic measurement feedback, the measurement feedback result may be transmitted via the PUCCH or the PUSCH.

In step S24, the measurement feedback for the reference signal corresponding to a second spatial dimension may be transmitted on a first available uplink sub-frame after an uplink sub-frame for the measurement feedback for the reference signal corresponding to a first spatial dimension.

As an example, the downlink reference signal may be a channel status information reference signal (CSI-RS), and the control message may be radio resource control (RRC) signaling. The plurality of spatial dimensions may include a horizontal direction and a vertical direction.

The RRC signaling contains the indication that the base station transmits the channel status information reference signals in the horizontal spatial dimension and the vertical spatial dimension in a form of transmitting mode information element. In addition, a parameter cqi-pmi-ConfigIndex in the RRC signaling is used for indicating the configuration of channel status information feedbacks by the user equipment with respect to the horizontal spatial dimension and the vertical spatial dimension, where a value range of the parameter cqi-pmi-ConfigIndex corresponding to the configuration of the channel status information feedback for the vertical spatial dimension is different from that for the horizontal spatial dimension. A parameter SubframeConfig in CSI-RS-Config of the RRC signaling is used for indicating configuration of transmission timings for the reference signals in different dimensions. The reference signals in different dimensions have different value ranges for the parameter SubframeConfig.

It is to be noted that, the above methods can be used separately or in conjunction with each other. The details have been described in detail in the first to third embodiments, and are not repeatedly described here.

Fifth Embodiment

In this embodiment, examples of an eNB to which the technology of the present disclosure is applied are provided.

First Application Example

Figure 15:
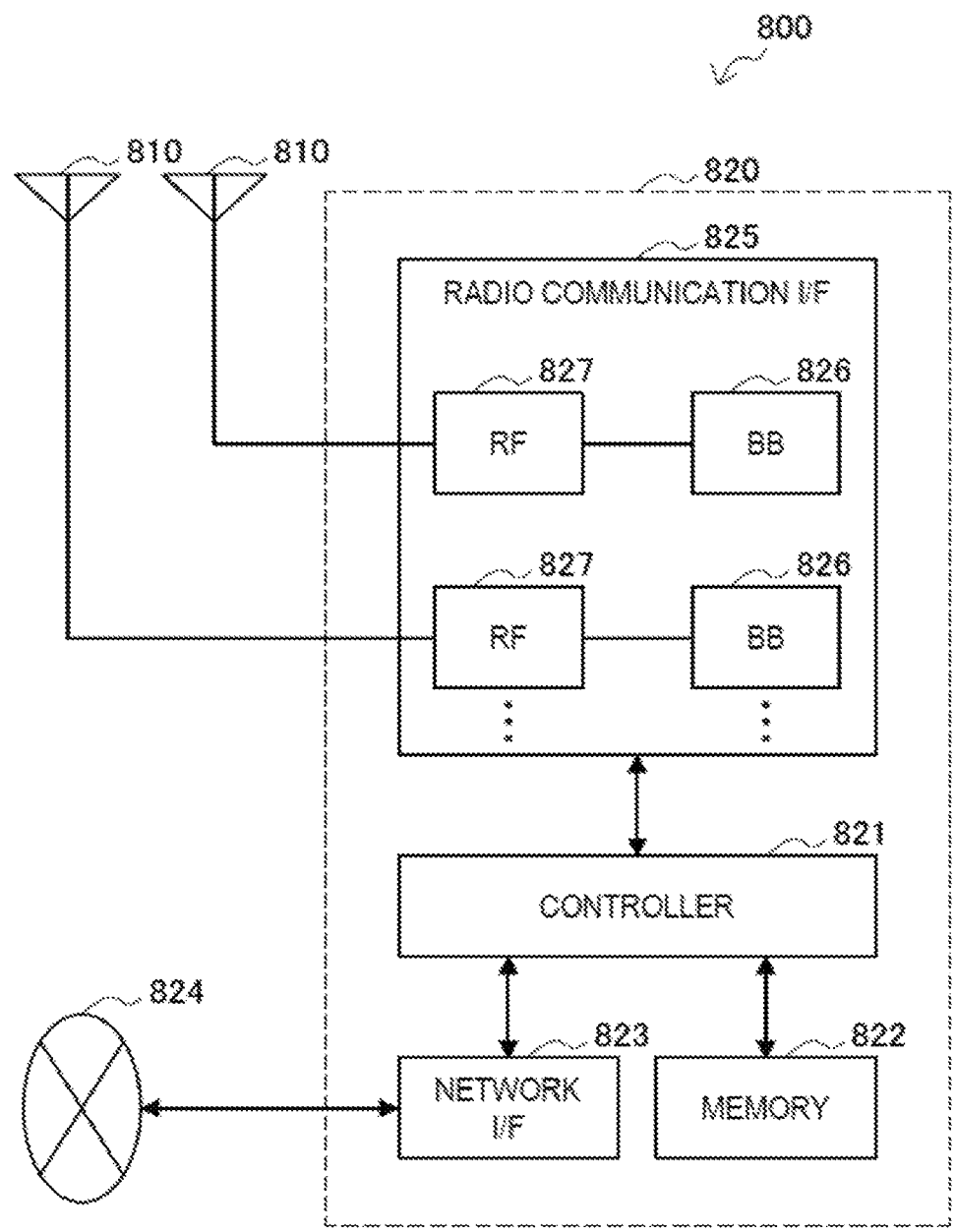
FIG. 15 is a block diagram illustrating a first example of a schematic configuration of an evolved Node B (eNB)

FIG. 15 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 15. For example, the multiple antennas 810 may be compatible with multiple frequency bands used by the eNB 800. Although FIG. 15 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 15. For example, the multiple BB processors 826 may be compatible with multiple frequency bands used by the eNB 800. The radio communication interface 825 may include the multiple RF circuits 827, as illustrated in FIG. 15. For example, the multiple RF circuits 827 may be compatible with multiple antenna elements. Although FIG. 15 illustrates the example in which the radio communication interface 825 includes the multiple BB processors 826 and the multiple RF circuits 827, the radio communication interface 825 may also include a single BB processor 826 or a single RF circuit 827.

Second Application Example

Figure 16:
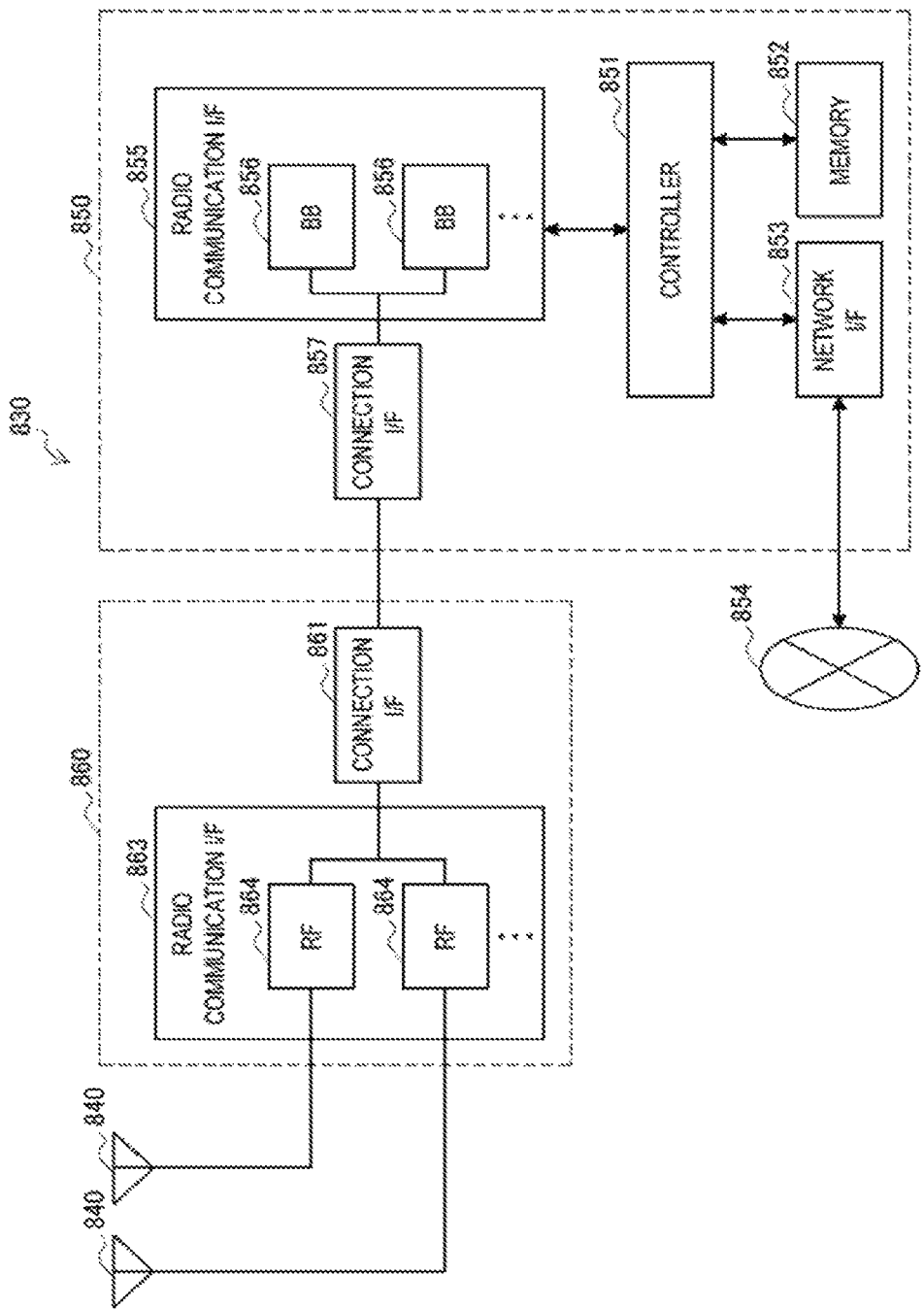
FIG. 16 is a block diagram illustrating a second example of a schematic configuration of an eNB.

FIG. 16 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 16. For example, the multiple antennas 840 may be compatible with multiple frequency bands used by the eNB 830. Although FIG. 16 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 15.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 15, except the BB processor 856 is connected to the RF circuit 864 of the RRH 860 via the connection interface 857. The radio communication interface 855 may include the multiple BB processors 856, as illustrated in FIG. 16. For example, the multiple BB processors 856 may be compatible with multiple frequency bands used by the eNB 830. Although FIG. 16 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 16. For example, the multiple RF circuits 864 may support multiple antenna elements. Although FIG. 16 illustrates the example in which the radio communication interface 863 includes the multiple RF circuits 864, the radio communication interface 863 may also include a single RF circuit 864.

In the eNB 800 and eNB 830 shown in FIG. 15 and FIG. 16, the transceiving unit and the transceiving module described with reference to FIGS. 1 and 2 may be implemented by the radio communication interface 825 and the radio communication interface 855 and/or the radio communication interface 863. At least a part of the functions may also be implemented by the controller 821 and the controller 851. For example, the controller 821 and the controller 851 may perform configuration of the downlink reference signal in multiple spatial dimensions and generation of the control message by performing functions of the reference signal configuration module 201 and the control message generation module 202.

Sixth Embodiment

In this embodiment, examples of a user equipment to which the technology of the present disclosure is applied are provided.

First Application Example

Figure 17:
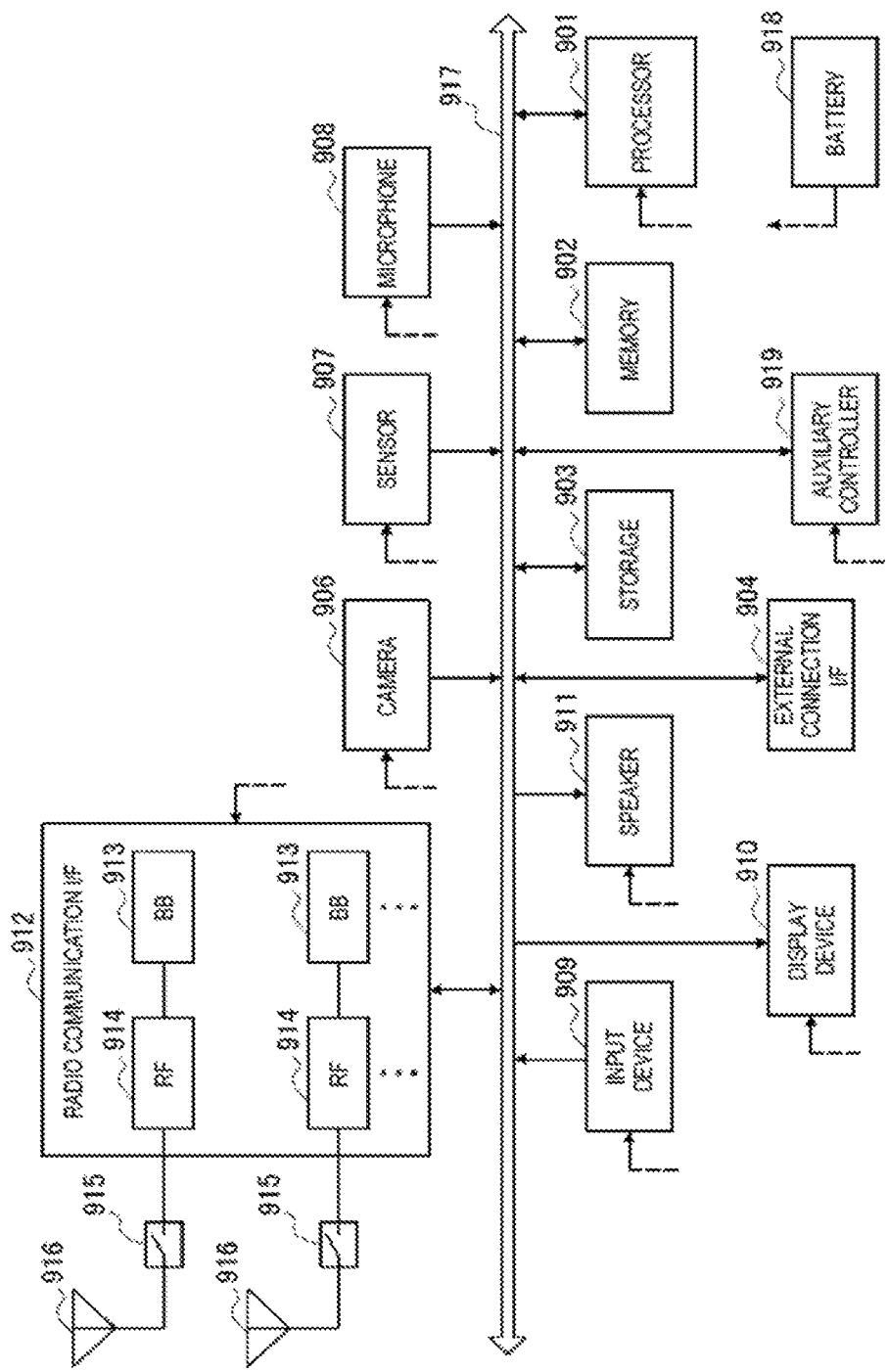
FIG. 17 is a block diagram illustrating an example of a schematic configuration of a first application example of a user equipment.

FIG. 17 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LET and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may be a one chip module having the BB processor 913 and the RF circuit 914 integrated thereon. The radio communication interface 912 may include the multiple BB processors 913 and the multiple RF circuits 914, as illustrated in FIG. 17. Although FIG. 17 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 17. Although FIG. 17 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 17 via feeder lines, which are partially shown as dashed lines in the figure. The auxiliary controller 919 operates a minimum necessary function of the smartphone 900, for example, in a sleep mode.

In the smartphone 900 illustrated in FIG. 17, the transceiving unit and the transceiving module described with reference to FIGS. 11 and 12 may be implemented by the radio communication interface 912, for example. At least a part of the functions may also be implemented by the processor 901 or the auxiliary controller 919. For example, the processor 901 or the auxiliary controller 919 can implement the measurement feedback for the downlink reference signal in each of the multiple spatial dimensions by performing functions of the determination module 401 and the feedback generation module 402.

Second Application Example

Figure 18:
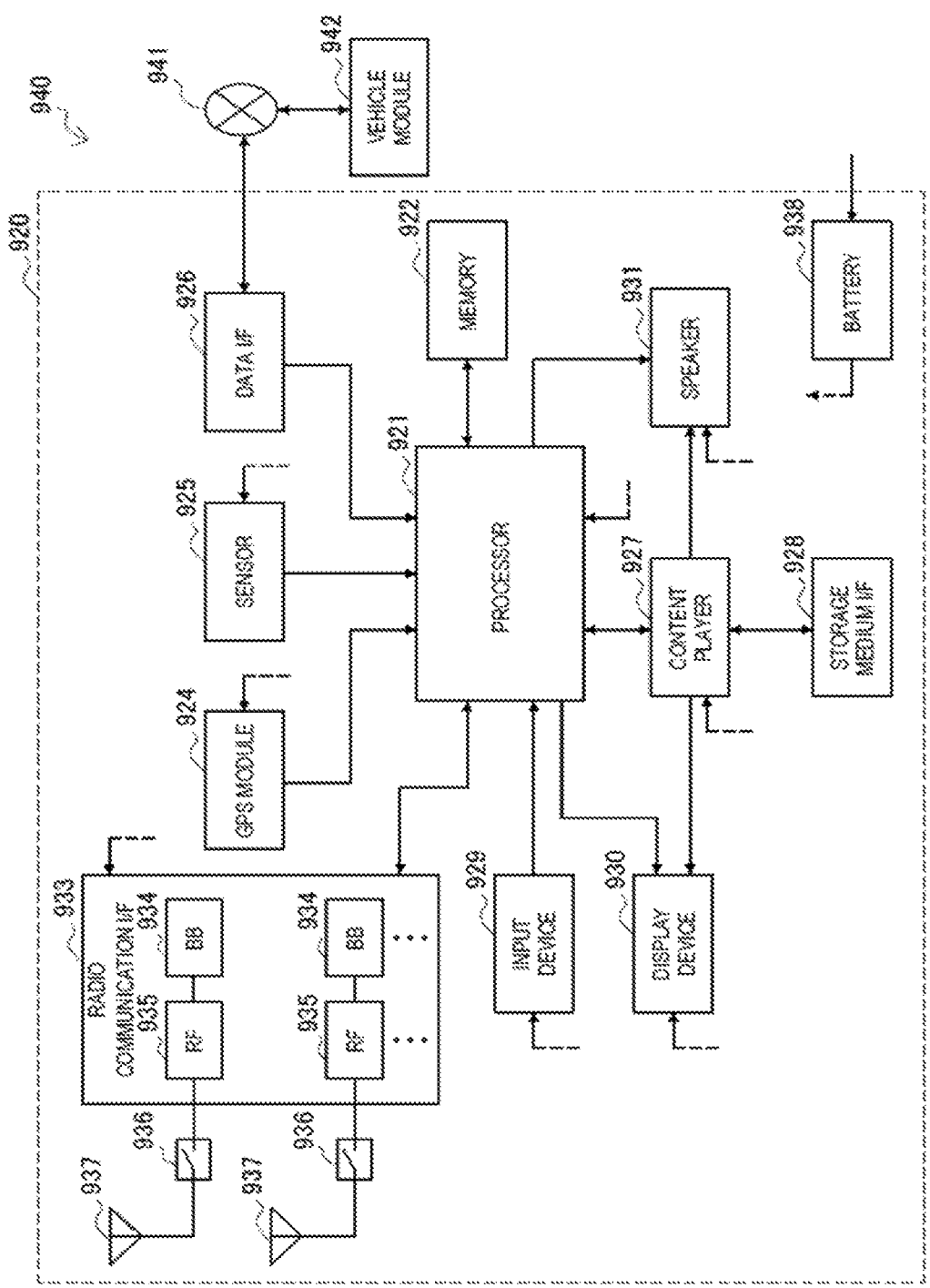
FIG. 18 is a block diagram illustrating an example of a schematic configuration of a second application example of a user equipment.

FIG. 18 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LTE and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may also be a one chip module that has the BB processor 934 and the RF circuit 935 integrated thereon. The radio communication interface 933 may include the multiple BB processors 934 and the multiple RF circuits 935, as illustrated in FIG. 18. Although FIG. 18 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 18. Although FIG. 18 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 18 via feeder lines that are partially shown as dashed lines in the figure. The battery 938 accumulates power supplied form the vehicle.

In the car navigation apparatus 920 illustrated in FIG. 18, the transceiving unit and the transceiving module described with reference to FIGS. 11 and 12 may be implemented by the radio communication interface 933. At least a part of the functions may also be implemented by the processor 921. For example, the processor 921 can implement the measurement feedback for the downlink reference signal in each of the multiple spatial dimensions by performing functions of the determination module 401 and the feedback generation module 402.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1900 shown in FIG. 19) from a storage medium or network, wherein the computer is capable of implementing various functions when installed with various programs.

Figure 19:
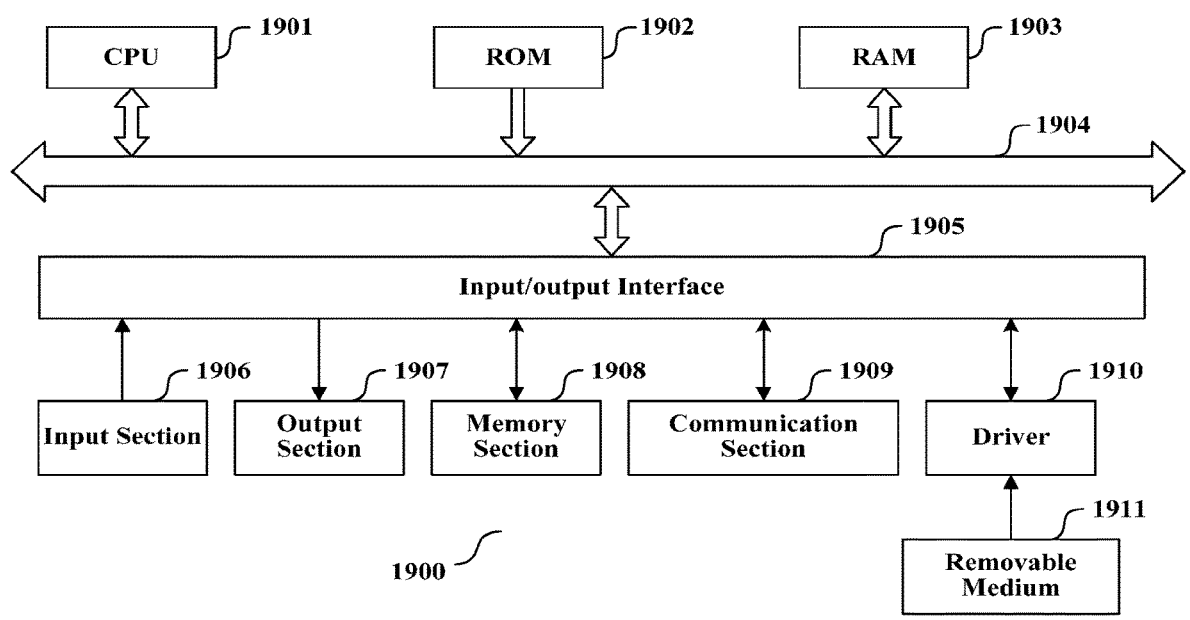
FIG. 19 is an exemplary block diagram illustrating the structure of a general purpose personal computer capable of realizing the method and/or device and/or system according to the embodiments of the present invention.

In FIG. 19, a central processing unit (CPU) 1901 executes various processing according to a program stored in a read-only memory (ROM) 1902 or a program loaded to a random access memory (RAM) 1903 from a memory section 1908. The data needed for the various processing of the CPU 1901 may be stored in the RAM 1903 as needed. The CPU 1901, the ROM 1902 and the RAM 1903 are linked with each other via a bus 1904. An input/output interface 1905 is also linked to the bus 1904.

The following components are linked to the input/output interface 1905: an input section 1906 (including keyboard, mouse and the like), an output section 1907 (including displays such as a cathode ray tube (CRT), a liquid crystal display (LCD), a loudspeaker and the like), a memory section 1908 (including hard disc and the like), and a communication section 1909 (including a network interface card such as a LAN card, modem and the like). The communication section 1909 performs communication processing via a network such as the Internet. A driver 1910 may also be linked to the input/output interface 1905. If needed, a removable medium 1911, for example, a magnetic disc, an optical disc, a magnetic optical disc, a semiconductor memory and the like, may be installed in the driver 1910, so that the computer program read therefrom is installed in the memory section 1908 as appropriate.

In the case where the foregoing series of processing is achieved by software, programs forming the software are installed from a network such as the Internet or a memory medium such as the removable medium 1911.

It should be appreciated by those skilled in the art that the memory medium is not limited to the removable medium 1911 shown in FIG. 19, which has program stored therein and is distributed separately from the apparatus so as to provide the programs to users. The removable medium 1911 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1902 and the memory section 1908 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An apparatus for wireless communications, comprising:
one or more processors, configured to:
configure, based on an antenna configuration of a base station, downlink reference signals of the base station in a plurality of spatial dimensions respectively; and
generate a control message containing an indication that the base station transmits the downlink reference signals in the plurality of spatial dimensions respectively, for use by a communication device served by the base station, wherein
the downlink reference signals at least partially specify a first antenna port set arranged at the base station to support MIMO transmission in a first dimension using a first channel status information reference signal (first CSI-RS-Config) and at least partially specify a second antenna port set arranged at the base station to support MIMO transmissions in a second dimension using a second channel status information reference signal (second CSI-RS-Config),
the second CSI-RS-Config is different than the first CSI-RS-Config,
the first CSI-RS-Config includes a first Subframe Config and the second CSI-RS-Config includes a second Subframe Config, the second Subframe Config being different from the first Subframe Config, and
the one or more processors is further configured to determine a spatial dimension of an individual downlink reference signal based on a position of a Subframe Config carrying the individual downlink reference signal.

2. The apparatus according to claim 1, wherein the one or more processors are configured to configure the downlink reference signals in different spatial dimensions to be transmitted via up to 8 different antenna ports per dimension.

3. The apparatus according to claim 2, wherein the one or more processors are further configured to map the downlink reference signals in different spatial dimensions into different transmission resources in a same pattern, to enable the communication device to distinguish the downlink reference signals in respective spatial dimensions, wherein the transmission resource corresponds to at least one of a sub-frame or a time slot.

4. The apparatus according to claim 1, wherein the one or more processors are further configured to contain, in the control message, at least one of a transmission parameter of the downlink reference signal in a specific spatial dimension by the base station and a measurement feedback parameter of the downlink reference signal in the specific spatial dimension by the communication device.

5. The apparatus according to claim 4, wherein the transmission parameter comprises at least one of a reference signal port configuration parameter, a period configuration parameter and sub-frame offset information corresponding to the specific spatial dimension, and the measurement feedback parameter comprises at least one of a measurement feedback period configuration parameter and sub-frame offset information configured for the communication device to perform measurement feedback for the reference signal corresponding to the specific spatial dimension.

6. The apparatus according to claim 5, wherein, transmission periods of reference signals corresponding to respective spatial dimensions are set to be different or measurement feedback periods of reference signals corresponding to respective spatial dimensions are set to be different.

7. The apparatus according to claim 1, wherein the apparatus is the base station and further comprises a transceiver configured to, for each of the plurality of spatial dimensions, transmit the downlink reference signal in the spatial dimension to the communication device, and receive a measurement feedback with respect to the reference signal for the spatial dimension from the communication device, respectively.

8. The apparatus according to claim 7, wherein the transceiver is configured to transmit the reference signals corresponding to respective spatial dimensions on different sub-frames, and receive measurement feedbacks corresponding to respective spatial dimensions on different sub-frames.

9. The apparatus according to claim 7, wherein, the transceiver receives the measurement feedback for reference signals corresponding to a part of the plurality of spatial dimensions via only a physical uplink data channel.

10. The apparatus according to claim 9, wherein the one or more processors are further configured to contain a non-periodic measurement feedback request for the reference signal corresponding to a specific spatial dimension in downlink control information or a random access response for use by the communication device.

11. The apparatus according to claim 10, wherein the transceiver is configured to receive measurement feedback for the reference signal corresponding to a second spatial dimension on a first available uplink sub-frame after an uplink sub-frame for the measurement feedback for the reference signal corresponding to a first spatial dimension.

12. The apparatus according to claim 1, wherein the control message is radio resource control signaling.

13. The apparatus according to claim 12, wherein the first dimension comprises a horizontal direction and the second dimension comprises a vertical direction.

14. The apparatus according to claim 13, wherein the one or more processors are configured to configure the first antenna port set for a horizontal channel status information reference signal and configure the second antenna port set for a vertical channel status information reference signal, wherein the first antenna port set and the second antenna port set each comprises 8 different antenna ports.

15. The apparatus according to claim 13, wherein the one or more processors contain an indication that the base station transmits the channel status information reference signals in a horizontal spatial dimension as the first dimension and in a vertical spatial dimension as the second dimension in the radio resource control signaling in a form of transmission mode information element.

16. The apparatus according to claim 13, wherein the one or more processors indicates configuration of channel status information feedbacks by the communication device with respect to a horizontal spatial dimension as the first dimension and a vertical spatial dimension as the second dimension using a parameter cqi-pmi-ConfigIndex in the radio resource control signaling, wherein a value of the parameter cqi-pmi-ConfigIndex corresponding to the configuration of the channel status information feedback with respect to the vertical spatial dimension is different from a value of the parameter cqi-pmi-ConfigIndex corresponding to the configuration of the channel status information feedback with respect to the horizontal spatial dimension.

17. The apparatus according to claim 12, wherein the one or more processors indicates configuration of transmission timings for the reference signals in different dimensions using a parameter SubframeConfig in CSI-RS-Config of the radio resource control signaling, the reference signals in different dimensions having different value ranges for the parameter SubframeConfig.

18. An apparatus for wireless communications, comprising:
one or more processors, configured to
determine, based on a control message from a base station, that the base station transmits downlink reference signals in a plurality of spatial dimensions respectively, wherein the downlink reference signals at least partially specify a first antenna port set arranged at the base station to support MIMO transmission in a first dimension using a first channel status information reference signal (first CSI-RS-Config) and at least partially specify a second antenna port set arranged at the base station to support MIMO transmissions in a second dimension using a second channel status information reference signal (second CSI-RS-Config), wherein the second CSI-RS-Config being different than the first CSI-RS-Config, and the first CSI-RS-Config includes a first Subframe Config and the second CSI-RS-Config includes a second Subframe Config, the second Subframe Config being different from the first Subframe Config;

measure, in response to a measurement indication from the base station, the downlink reference signals in respective spatial dimensions and generate measurement feedback information for respective spatial dimensions, and the one or more processors is further configured to determine a spatial dimension of an individual downlink reference signal based on a position of a Subframe Config carrying the individual downlink reference signal.

19. The apparatus according to claim 18, wherein, the control message comprises at least one of a transmission parameter of the downlink reference signal in a specific spatial dimension by the base station and a measurement feedback parameter of the downlink reference signal in the specific spatial dimension by the apparatus.

20. The apparatus according to claim 19, wherein the transmission parameter comprises at least one of a reference signal port configuration parameter, a period configuration parameter and sub-frame offset information corresponding to the specific spatial dimension, and the measurement feedback parameter comprises at least one of a measurement feedback period configuration parameter and sub-frame offset information configured for the apparatus to perform measurement feedback for the reference signal corresponding to the specific spatial dimension.

* * * * *